US006708171B1

(12) United States Patent
Waldo et al.

(10) Patent No.: US 6,708,171 B1
(45) Date of Patent: Mar. 16, 2004

(54) NETWORK PROXY

(75) Inventors: James H. Waldo, Dracut, MA (US); John W. F. McClain, Arlington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/332,031

(22) Filed: Jun. 14, 1999

Related U.S. Application Data

(63) Continuation-in-part of application No. 09/044,826, filed on Mar. 20, 1998, which is a continuation-in-part of application No. 09/044,923, filed on Mar. 20, 1998, now Pat. No. 6,263,350, which is a continuation-in-part of application No. 09/044,838, filed on Mar. 20, 1998, now Pat. No. 6,247,026, which is a continuation-in-part of application No. 09/044,834, filed on Mar. 20, 1998, now Pat. No. 6,421,704, which is a continuation-in-part of application No. 09/044,916, filed on Mar. 20, 1998, now Pat. No. 6,016,500, which is a continuation-in-part of application No. 09/044,933, filed on Mar. 20, 1998, now Pat. No. 6,463,446, which is a continuation-in-part of application No. 09/044,919, filed on Mar. 20, 1998, now Pat. No. 6,272,559, which is a continuation-in-part of application No. 09/044,938, filed on Mar. 20, 1998, now Pat. No. 6,487,607, which is a continuation-in-part of application No. 09/045,652, filed on Mar. 20, 1998, now Pat. No. 6,134,603, which is a continuation-in-part of application No. 09/044,790, filed on Mar. 20, 1998, now Pat. No. 6,598,094, which is a continuation-in-part of application No. 09/044,930, filed on Mar. 20, 1998, now Pat. No. 6,393,497, which is a continuation-in-part of application No. 09/044,917, filed on Mar. 20, 1998, now Pat. No. 6,237,024, which is a continuation-in-part of application No. 09/044,835, filed on Mar. 20, 1998, now Pat. No. 6,182,083, which is a continuation-in-part of application No. 09/044,839, filed on Mar. 20, 1998, now abandoned, which is a continuation-in-part of application No. 09/044,945, filed on Mar. 20, 1998, now Pat. No. 6,578,044, which is a continuation-in-part of application No. 09/044,931, filed on Mar. 20, 1998, now Pat. No. 6,185,611, which is a continuation-in-part of application No. 09/044,939, filed on Mar. 20, 1998, now Pat. No. 6,560,656, which is a continuation-in-part of application No. 09/044,932, filed on Mar. 20, 1998, now Pat. No. 6,466,947, which is a continuation-in-part of application No. 09/030,840, filed on Feb. 26, 1998, now Pat. No. 6,446,070, which is a continuation-in-part of application No. 09/044,936, filed on Mar. 20, 1998, now abandoned, which is a continuation-in-part of application No. 09/044,934, filed on Mar. 20, 1998, now Pat. No. 6,438,614, which is a continuation-in-part of application No. 09/044,915, filed on Mar. 20, 1998, now Pat. No. 6,138,238, which is a continuation-in-part of application No. 09/044,837, filed on Mar. 20, 1998, now Pat. No. 6,282,652, which is a continuation-in-part of application No. 09/044,944, filed on Mar. 20, 1998, now Pat. No. 6,226,746, which is a continuation-in-part of application No. 08/636,706, filed on Apr. 23, 1996, now abandoned.

(60) Provisional application No. 60/076,048, filed on Feb. 26, 1998.

(51) Int. Cl.[7] .............................................. G06F 17/00
(52) U.S. Cl. ...................... 707/10; 709/203; 709/313
(58) Field of Search .............. 707/1–206; 709/200–212, 709/310–317

(56) References Cited

U.S. PATENT DOCUMENTS 4,430,699 A    2/1984   Segarra et al.

(List continued on next page.)

FOREIGN PATENT DOCUMENTS

EP          300 516 A2     1/1989

(List continued on next page.)

OTHER PUBLICATIONS

Sun Microsystems: "Jini (TM) Architectural Overview", Technical White Paper, Jan. 1999.

(List continued on next page.)

Primary Examiner—David Jung
(74) Attorney, Agent, or Firm—Finnegan, Henderson, Farabow, Garrett & Dunner, L.L.P.

(57) ABSTRACT

A network proxy is provided that facilitates the integration of orphan services into a network by enabling them to interact with a lookup service that contains an indication of the services that are available on the network. These orphan services typically reside on devices having too little memory to run the components necessary to be integrated into the network. Thus, the network proxy acts as a go between, by registering the orphan services with the lookup service so that clients may access them and by accessing services on behalf of the orphan services. As a result, the network proxy integrates orphan services into the network, when they otherwise would be incapable of doing so.

16 Claims, 13 Drawing Sheets

U.S. PATENT DOCUMENTS

| | | |
|---|---|---|
| 4,491,946 A | 1/1985 | Kryskow, Jr. et al. |
| 4,558,413 A | 12/1985 | Schmidt et al. |
| 4,713,806 A | 12/1987 | Oberlander et al. |
| 4,809,160 A | 2/1989 | Mahon et al. |
| 4,823,122 A | 4/1989 | Mann et al. |
| 4,939,638 A | 7/1990 | Stephenson et al. |
| 4,956,773 A | 9/1990 | Saito et al. |
| 5,088,036 A | 2/1992 | Ellis et al. |
| 5,109,486 A | 4/1992 | Seymour |
| 5,187,787 A | 2/1993 | Skeen et al. |
| 5,218,699 A | 6/1993 | Brandle et al. |
| 5,257,369 A | 10/1993 | Skeen et al. |
| 5,293,614 A | 3/1994 | Ferguson et al. |
| 5,297,283 A | 3/1994 | Kelly, Jr. et al. |
| 5,307,490 A | 4/1994 | Davidson et al. ........... 395/650 |
| 5,311,591 A | 5/1994 | Fischer |
| 5,339,435 A | 8/1994 | Lubkin et al. |
| 5,386,568 A | 1/1995 | Wold et al. |
| 5,390,328 A | 2/1995 | Frey et al. |
| 5,392,280 A | 2/1995 | Zheng |
| 5,423,042 A | 6/1995 | Jalili et al. |
| 5,440,744 A | 8/1995 | Jacobson et al. |
| 5,448,740 A | 9/1995 | Kiri et al. |
| 5,452,459 A | 9/1995 | Drury et al. |
| 5,455,952 A | 10/1995 | Gjovaag |
| 5,471,629 A | 11/1995 | Risch |
| 5,475,792 A | 12/1995 | Stanford et al. |
| 5,475,817 A | 12/1995 | Waldo et al. |
| 5,481,721 A | 1/1996 | Serlet et al. |
| 5,504,921 A | 4/1996 | Dev et al. |
| 5,511,197 A | 4/1996 | Hill et al. |
| 5,524,244 A | 6/1996 | Robinson et al. |
| 5,548,726 A | 8/1996 | Pettus |
| 5,553,282 A | 9/1996 | Parrish et al. |
| 5,555,367 A | 9/1996 | Parrish et al. |
| 5,555,427 A | 9/1996 | Aoe et al. |
| 5,557,798 A | 9/1996 | Skeen et al. |
| 5,560,003 A | 9/1996 | Nilsen et al. |
| 5,561,785 A | 10/1996 | Blandy et al. |
| 5,577,231 A | 11/1996 | Scalzi et al. |
| 5,594,921 A | 1/1997 | Pettus |
| 5,603,031 A | 2/1997 | White et al. |
| 5,617,537 A | 4/1997 | Yamada et al. |
| 5,628,005 A | 5/1997 | Hurvig |
| 5,640,564 A | 6/1997 | Hamilton et al. |
| 5,644,768 A | 7/1997 | Periwal et al. |
| 5,652,888 A | 7/1997 | Burgess |
| 5,655,148 A | 8/1997 | Richman et al. |
| 5,659,751 A | 8/1997 | Heninger |
| 5,671,225 A | 9/1997 | Hooper et al. |
| 5,675,796 A | 10/1997 | Hodges et al. |
| 5,680,573 A | 10/1997 | Rubin et al. |
| 5,680,617 A | 10/1997 | Gough et al. |
| 5,684,955 A | 11/1997 | Meyer et al. |
| 5,689,709 A | 11/1997 | Corbett et al. |
| 5,706,435 A | 1/1998 | Barbara et al. |
| 5,706,502 A | 1/1998 | Foley et al. |
| 5,724,588 A | 3/1998 | Hill et al. |
| 5,727,145 A | 3/1998 | Nessett et al. |
| 5,737,607 A | 4/1998 | Hamilton et al. |
| 5,745,678 A | 4/1998 | Herzberg et al. |
| 5,745,695 A | 4/1998 | Gilchrist et al. |
| 5,745,703 A | 4/1998 | Cejtin et al. |
| 5,745,755 A | 4/1998 | Covey |
| 5,748,897 A | 5/1998 | Katiyar |
| 5,754,849 A | 5/1998 | Dyer et al. |
| 5,757,925 A | 5/1998 | Faybishenko |
| 5,758,344 A | 5/1998 | Prasad et al. |
| 5,761,656 A | 6/1998 | Ben-Shachar |
| 5,764,897 A | 6/1998 | Khalidi |
| 5,768,532 A | 6/1998 | Megerian |
| 5,774,551 A | 6/1998 | Wu et al. |
| 5,778,187 A | 7/1998 | Monteiro et al. |
| 5,778,228 A | 7/1998 | Wei |
| 5,778,368 A | 7/1998 | Hogan et al. |
| 5,784,560 A | 7/1998 | Kingdon et al. |
| 5,787,425 A | 7/1998 | Bigus |
| 5,787,431 A | 7/1998 | Shaughnessy |
| 5,790,548 A | 8/1998 | Sistanizadeh et al. |
| 5,802,367 A | 9/1998 | Held et al. |
| 5,808,911 A | 9/1998 | Tucker et al. |
| 5,809,507 A | 9/1998 | Cavanaugh, III |
| 5,812,819 A | 9/1998 | Rodwin et al. |
| 5,813,013 A | 9/1998 | Shakib et al. |
| 5,815,149 A | 9/1998 | Mutschler, III et al. |
| 5,815,709 A | 9/1998 | Waldo et al. |
| 5,815,711 A | 9/1998 | Sakamoto et al. |
| 5,818,448 A | 10/1998 | Katiyar |
| 5,829,022 A | 10/1998 | Watanabe et al. |
| 5,832,219 A | 11/1998 | Pettus |
| 5,832,529 A | 11/1998 | Wollrath et al. |
| 5,832,593 A | 11/1998 | Wurst et al. |
| 5,835,737 A | 11/1998 | Sand et al. |
| 5,842,018 A | 11/1998 | Atkinson et al. |
| 5,844,553 A | 12/1998 | Hao et al. |
| 5,845,090 A | 12/1998 | Collins, III et al. |
| 5,845,129 A | 12/1998 | Wendorf et al. |
| 5,860,004 A | 1/1999 | Fowlow et al. |
| 5,860,153 A | 1/1999 | Matena et al. |
| 5,864,862 A | 1/1999 | Kriens et al. |
| 5,864,866 A | 1/1999 | Henckel et al. |
| 5,872,928 A | 2/1999 | Lewis et al. |
| 5,872,973 A | 2/1999 | Mitchell et al. |
| 5,875,335 A | 2/1999 | Beard |
| 5,878,411 A | 3/1999 | Burroughs et al. |
| 5,884,024 A | 3/1999 | Lim et al. |
| 5,884,079 A | 3/1999 | Furusawa |
| 5,887,134 A | 3/1999 | Ebrahim |
| 5,889,951 A | 3/1999 | Lombardi |
| 5,890,158 A | 3/1999 | House et al. |
| 5,892,904 A | 4/1999 | Atkinson et al. |
| 5,933,497 A | 8/1999 | Beetcher et al. |
| 5,933,647 A | 8/1999 | Aronberg et al. |
| 5,935,249 A | 8/1999 | Stern et al. |
| 5,940,827 A | 8/1999 | Hapner et al. |
| 5,944,793 A | 8/1999 | Islam et al. |
| 5,946,485 A | 8/1999 | Weeren et al. |
| 5,946,694 A | 8/1999 | Copeland et al. |
| 5,951,652 A | 9/1999 | Ingrassia, Jr. et al. |
| 5,956,509 A | 9/1999 | Kevner |
| 5,966,531 A | 10/1999 | Skeen et al. |
| 5,969,967 A | 10/1999 | Aahlad et al. |
| 5,974,201 A | 10/1999 | Chang et al. |
| 5,978,484 A | 11/1999 | Apperson et al. |
| 5,987,506 A | 11/1999 | Carter et al. |
| 5,999,179 A | 12/1999 | Kekic et al. |
| 5,999,988 A | 12/1999 | Pelegri-Llopart et al. |
| 6,003,763 A | 12/1999 | Gallagher et al. |
| 6,009,103 A | 12/1999 | Woundy |
| 6,016,496 A | 1/2000 | Roberson |
| 6,023,586 A | 2/2000 | Gaisford et al. |
| 6,026,414 A | 2/2000 | Anglin |
| 6,031,977 A | 2/2000 | Pettus |
| 6,052,761 A | 4/2000 | Hornung et al. |
| 6,058,383 A | 5/2000 | Narasimhalu et al. |
| 6,061,699 A | 5/2000 | DiCecco et al. |
| 6,061,713 A | 5/2000 | Bharadhwaj |
| 6,067,575 A | 5/2000 | McManis et al. |
| 6,085,255 A | 7/2000 | Vincent et al. |
| 6,108,346 A | 8/2000 | Doucette et al. |
| 6,185,602 B1 | 2/2001 | Bayrakeri |

| | | | |
|---|---|---|---|
| 6,185,611 B1 | 2/2001 | Waldo et al. | |
| 6,226,746 B1 | 5/2001 | Scheifler | |
| 6,247,091 B1 | 6/2001 | Lovett | |
| 6,282,295 B1 | 8/2001 | Young et al. | |
| 6,282,568 B1 | 8/2001 | Sondur et al. | |

FOREIGN PATENT DOCUMENTS

| | | |
|---|---|---|
| EP | 351 536 A3 | 1/1990 |
| EP | 384 339 A3 | 8/1990 |
| EP | 472 874 A1 | 3/1992 |
| EP | 474 340 A2 | 3/1992 |
| EP | WO 92/07335 A1 | 4/1992 |
| EP | 497 022 A1 | 8/1992 |
| EP | 555 997 A2 | 8/1993 |
| EP | 565 849 A2 | 10/1993 |
| EP | 569 195 A3 | 11/1993 |
| EP | 625 750 A2 | 11/1994 |
| EP | 635 792 A2 | 1/1995 |
| EP | 651 328 A1 | 5/1995 |
| EP | 660 231 A2 | 6/1995 |
| EP | 697 655 A2 | 2/1996 |
| EP | 718 761 A1 | 6/1996 |
| EP | 767 432 A2 | 4/1997 |
| EP | 778 520 A2 | 6/1997 |
| EP | 794 493 A2 | 9/1997 |
| EP | 803 810 A2 | 10/1997 |
| EP | 803 911 A2 | 10/1997 |
| EP | 805 393 A2 | 11/1997 |
| EP | 810 524 A1 | 12/1997 |
| EP | 817 020 A2 | 1/1998 |
| EP | 817 022 A2 | 1/1998 |
| EP | 817 025 A2 | 1/1998 |
| EP | 836 140 A2 | 4/1998 |
| GB | 2 253 079 A | 8/1992 |
| GB | 2 262 825 A | 6/1993 |
| GB | 2 305 087 A | 3/1997 |
| JP | 11-45187 | 2/1999 |
| WO | WO 92/09948 A1 | 6/1992 |
| WO | WO93/25962 A1 | 12/1993 |
| WO | WO94/03855 A1 | 2/1994 |
| WO | WO 96/03692 A1 | 2/1996 |
| WO | WO 96/10787 A1 | 4/1996 |
| WO | WO 96/18947 A1 | 6/1996 |
| WO | WO 96/24099 A1 | 8/1996 |
| WO | WO 98/02814 A1 | 1/1998 |
| WO | WO 98/04971 A1 | 2/1998 |

OTHER PUBLICATIONS

Sun Microsystems: "Jini (TM) Device Architecture Specification", Jini Specifications, Jan. 25, 1999.

Krause, J., "What the Hell is . . . Jini?", The Industry Standard, Jul. 27, 1998.

Wollrath et al., "A Distributed Object Model for the Java (TM) System," USENIX Association, Conference on Object-Oriented Technologies and Systems, Jun. 17–21, 1996.

Aldrich et al., "Providing Easier Access to Remote Objects in Client–Server Systems," System Sciences, 1998, Proceedings of the 31st Hawaii Internat'l. Conference, Jan. 6–9, 1998, pp. 366–375.

Aldrich et al., "Providing Easier Access to Remote Objects in Distributed Systems," Calif. Institute of Technology, www.cs.caltech.edu/%7Ejedi/paper/jedipaper.html, Nov. 21, 1997.

Burns et al., "An Analytical Study of Opportunistic Lease Renewal," Distributed Computing Systems, 21st International Conference, pp. 146–153, Apr. 2000.

Dollimore et al., "The Design of a System for Distributing Shared Objects," The Computer Journal, No. 6, Cambridge, GB, Dec. 1991.

Fleish et al., "High Performance Distributed Objects Using Distributed Shared Memory & Remote Method Invocation," System Sciences, 1998, Proceedings of the 31st Hawaii Internat'l. Conference, Jan. 6–9, 1998, pp. 574–578.

Guyennet et al., "A New Consistency Protocol Implemented in the CAliF System," IEEE, 1094–7256/97, pp. 82–87, 1997.

Guyennet et al., "Distributed Shared Memory Layer for Cooperative Work Applications," IEEE, 0742–1303/97, pp. 72–78, 1997.

Hoshi et al., "Allocation of the Cross–Connect Function in Leased Circuit Networks," 1992, ICC'92, conference record, SUPERCOMM/ICC '02, D a New World of Communcations, IEEE International Conference, pp. 1408–1412.

IBM Technical Disclosure Bulletin, "Local Network Monitoring to Populate Access Agent Directory," vol. 36, No. 09A, pp. 403–405, Sep. 1993.

McGrath, "Discovery and its Discontents: Discovery Protocols for Ubiquitous Computing," Presented at Center for Excellence in Space Data and Information Science, NASA Goddard Space Flight Center, Apr. 5, 2000.

Mitchell et al., "Mesa Language Manual," Xerox Corporation, Palo Alto Research Center, 1978.

MUX–Elektronik, Java 1.1 Interactive Course, www.lis.se/–mux/javalc.html, 1995.

Stevenson, "Token–Based Consistency of Replicated Servers," IEEE, CH2686–4/89/0000/0179, pp. 179–183, 1989.

Yin et al., "Volume Leases for Consistency in Large–Scale Systems," IEEE Transactions on Knowledge & Data Engineering, vol. 11, No. 4, pp. 563–576, Jul./Aug. 1999.

"Java (TM) Remote Method Invocation Specification," Sun Microsystems, Inc., <java.sun.com/products/jdk1.2beta1>, 1997.

"Transparent Network Computing," Locus Computing Corporation, Jan. 5, 1995.

Agha et al., "Actorspaces: An Open Distributed Programming Paradigm," University of Illinois, Report No. UIUCDCS–R–92–1766, Open Systems Laboratory TR No. 8, pp. 1–12, Nov. 1992.

Ahmed et al., "A Program Building Tool for Parallel Applications," Yale University, pp. 1–23, Dec. 1, 1993.

Alexander et al., "Active Bridging," Proceedings of the ACM/SIGCOMM'97 Conference, Cannes, France, Sep. 1997.

Anderson et al., "Persistent Linda: Linda + Transactions + Query Processing," Proceedings of the 13th Symposium on Fault Tolerant Systems, pp. 93–109, 1991.

Anonymous, "Change–Notification Service for Shared Files," IBM Technical Disclosure Bulletin, vol. 36, No. 8, pp. 77–82, XP002108713, New York, US, Aug. 1993.

Anonymous, "Resource Preemption for Priority Scheduling," IBM Technical Disclosure Bulletin, vol. 16, No. 6, pp. 1931, XP002109435 New York, US, Nov. 1973.

Beech et al., "Object Databases as Generalizations of Relational Databases," Computer Standards & Interfaces, vol. 13, Nos. 1/3, pp. 221–230, Amsterdam, NL, Jan. 1991.

Bertino et al., "Object–Oriented Database Management Systems: Concepts and Issues," Computer, vol. 24, No. 4, pp. 33–47, Los Alamitos, CA, Apr. 1991.

Betz et al., "Interoperable Objects: Laying the Foundation for Distributed Object Computing," Dr. Dobb's Journal, vol. 19, No. 11, pp. 18(13), Oct. 1994.

Bevan et al., "An Efficient Reference Counting Solution To The Distributed Garbage Collection Problem," Parallel Computing, NL, Elsevier Science Publishers, Amsterdam, vol. 9, No. 2, pp. 179–192, Jan. 1989.

Birrell et al., "Distributed Garbage Collection for Network Objects," Digital Systems Research Center, No. 116, pp. 1–18, Dec. 15, 1993.

Birrell et al., "Grapevine: An Exercise in Distribution Computing," Communications of the ACM, vol. 25, No. 4, pp. 260–274, Apr. 1982.

Birrell e al., "Implementing Remote Procedure Calls," ACM Transactions on Computer Systems, vol. 2 No. 1, pp. 39–59, Feb. 1984.

Birrell et al., "Network Objects," DEC SRC Research Report 115, Feb. 28, 1994.

Birrell et al., "Network Objects," Operating Systems Review, 27(5), pp. 217–230, Dec. 1993.

Cannon et al., "Adding Fault–Tolerant Transaction Processing to LINDA," Software–Practice and Experience, vol. 24(5), pp. 449–466, May 1994.

Cardelli, "Obliq, A Lightweight Language For Network Objects," Digital SRC, pp. 1–37, Nov. 5, 1993.

Carriero et al., "Distributed data Structures in Linda," Principles of Programming Language, pp. 1–16, 1986.

Carriero et al., "Distributed Data Structures in Linda," Yale Research Report YALEU/DCS/RR–438, Nov. 1985.

Chung et al., "A 'Tiny' Pascal Compiler: Part 1: The P–Code Interpreter," BYTE Publications, Inc., Sep. 1978.

Chung et al., "A 'Tiny' Pascal Compiler: Part 2: The P–Compiler," BYTE Publications, Inc., Oct. 1978.

Coulouris et al., "Distributed Systems Concepts and Designs," Second Edition, Addison–Wesley, 1994.

Dave et al., "Proxies, Application Interface, And Distributed Systems," Proceedings International Workshop On Object Orientation In Operating Systems, pp. 212–220, Sep. 24, 1992.

Deux et al., "The O2 System," Communications Of The Association For Computing Machinery, vol. 34, No. 10, pp. 34–48, Oct. 1, 1991.

Dijkstra, "Self–stabilizing Systems in Spite of Distributed Control," Communications of the ACM, vol. 17, No. 11, pp. 643–644, Nov. 1974.

Dolev et al., "On the Minimal Synchronism Needed for Distributed Consensus," Journal of the ACM, vol. 34, No. 1, pp. 77–97, Jan. 1987.

Dourish, "A Divergence–Based Model of Synchrony and Distribution in Collaborative Systems," Xerox Technical Report EPC–1194–102, pp. 1–10, 1994.

Drexler et al., "Incentive Engineering for Computational Resource Management," The Ecology of Computation, Elsevier Science Publishers B.V., pp. 231–236, 1988.

Droms, "RFC 1541 Dynamic Host Configuration Protocol," <http://www.cis.ohio–state.edu/htbin/rfc/rfc1541.html>, pp. 1–33, Oct. 1993.

Emms, "A Definition Of An Access Control Systems Language," Computer Standards And Interfaces, vol. 6, No. 4, pp. 443–454, Jan. 1, 1987.

Gelernter et al., "Parallel Programming in Linda," Yale University, pp. 1–21, Jan. 1985.

Gelernter, "Generative Communication in Linda," ACM Transactions on Programming Languages and Systems, vol. 7, No. 1, pp. 80–112, Jan. 1985.

Gosling et al., "The Java (TM) Language Specification," Addison–Wesley, 1996.

Gottlob et al., "Extending Object–Oriented Systems and Roles," ACM Transactions On Information Systems, vol. 14, No. 3, pp. 268–296, Jul. 1996.

Gray et al., "Leases: An Efficient Fault–Tolerant Mechanism for Distributed File Cache Consistency," ACM, pp. 202–210, 1989.

Guth, "JavaOne: Sun to Expand Java Distributed Computing Effort," <http://www.sunworld.com/swol–02–1998/swol–02–sunsports.html>, XP002109935, P.1, Feb. 20, 1998.

Hamilton et al., "Subcontract: A Flexible Base For Distributed Programming," Proceedings of 14th Symposium of Operating System Principles, Dec. 1993.

Hamilton, "Java and the Shift to Net–Centric Computing," Computer, pp. 31–39, Aug. 1996.

Harris et al., "Proposal for a General Java Proxy Class for Distributed Systems and Other Uses," Netscape Communications Corp., Jun. 25, 1997.

Hartman et al., "Liquid Software: A New Paradigm For Networked Systems," Technical Report 96–11, Department of Comp. Sci., Univ. of Arizona, Jun. 1996.

Howard et al., "Scale and Performance in a Distributed File System," ACM Transactions on Computer Systems, vol. 6, No. 1, pp. 51–81, Feb. 1988.

Hunt, "IDF: A Graphical Data Flow Programming Language for Image Processing and Computer Vision," Proceedings of the International Conference on Systems, Man, and Cybernetics, pp. 351–360, Los Angeles, Nov. 4–7, 1990.

IBM (TM) Technical Disclosure Bulletin, "Object Location Algorithm," vol. 36, No. 09B, pp. 257–258, Sep. 1993.

IBM (TM) Technical Disclosure Bulletin, "Retrieval of Qualified Variables Using Extendible Hashing," vol. 36, No. 12, pp. 301–303, Dec. 1993.

IBM, "Chapter 6—Distributed SOM (DSOM)," SOMobjects Developer Toolkit Users Guide, Version 2.1, pp. 6–1–6–90, Oct. 1994.

Jaworski, "Java 1.1 Developer's Guide, 2nd Edition," Sams.net, 1997.

Jones et al., "Garbage Collection: Algorithms for Automatic Dynamic Memory Management," pp. 165–175, John Wiley & Sons, 1996.

Kambhatia et al., "Recovery with Limited Replay: Fault-–Tolerant Processing in Linda," Oregon Graduate Institute, Technical Report CSIE90–019, pp. 1–16, Sep. 1990.

Kay et al., "An Overview of the Raleigh Object–Oriented Database System," ICL Technical Journal, vol. 7, No. 4, pp. 780–798, Oxford, GB, Nov. 1991.

Kougiouris et al., "Support for Space Efficient Object Invocation in Spring," Sep. 1994.

Krasner, "The Smalltalk–80 Virtual Machine," BYTE Publications Inc., pp. 300–320, Aug. 1991.

Lamport et al., "The Byzantine Generals Problem," ACM Transactions on Programming Languages and Systems, vol. 4, No. 3, pp. 382–401, Jul. 1982.

LINDA Database Search, pp. 1–68, Jul. 20, 1995.

Lindholm et al., "The Java (TM) Virtual Machine Specification," Addison Wesley, 1996.

Liskov et al., "Distributed Object Management in Thor," International Workshop on Distributed Object Management, p. 12, 1992.

McDaniel, "An Analysis of a Mesa Instruction Set," Xerox Corporation, May 1982.

Mitchell et al. "An Overview of the Spring System," Feb. 1994.

Mullender, "Distributed Systems," Second Edition, Addison–Wesley, 1993.

Mummert et al., "Long Term Distributed File Reference Tracing: Implementation and Experience," Carnegie Mellon University School of Computer Science, pp. 1–28, Nov. 1994.

Orfall et al., "The Essential Distributed Objects Survival Guide," Chapter 11; Corba Commercial ORBs, pp. 203–215, John Wiley & Sons, Inc., 1996.

Ousterhout et al., "The Sprite Network Operating System," Computer, IEEE, pp. 23–36, Feb. 1988.

Pier, "A Retrospective on the Dorando, A High–Performance Personal Computer," IEEE Conference Proceedings, The 10th Annual International Symposium on Computer Architecture, 1983.

Pier, "A Retrospective on the Dorando, A High–Performance Personal Computer," Xerox Corporation, Aug. 1983.

Pinakis, "Using Linda as the Basis of an Operating System Microkernel," University of Western Australia, Department of Computer Science, pp. 1–165, Aug. 1993.

Riggs et al., "Pickling State in the Java (TM) System," USENIX Association Conference on Object–Oriented Technologies and Systems, XP–002112719, pp. 241–250, Jun. 17–21, 1996.

Rosenberry et al., "Understanding DCE," Chapter 1–3, 6, 1992.

Sharrott et al., "ObjectMap: Integrating High Performance Resources into a Distributed Object–oriented Environment," ICODP, 1995.

Thompson, "Regular Expression Search Algorithm," Communications of the ACM, vol. II, No. 6, p. 149 et seq., Jun. 1968.

Venners, "Jini Technology, Out of the Box," JAVAWORLD, 'Online!, pp. 1–4, Dec. 1998.

Waldo et al., "Events in An RPC Based Distributed System," Proceedings Of The 1995 USENIX Technical Conference, Proceedings USENIX Winter 1995 Technical Conference, New Orleans, LA, USA, 16–20, pp. 131–142, Jan. 1995.

Wilson et al., "Design of the Opportunistic Garbage Collector," Proceedings of the Object Oriented Programming Systems Languages And Applications Conference, New Orleans, vol. 24, No. 10, Oct. 1989.

Wu, "A Type System For An Object–Oriented Database System," Proceedings of the International Computer Software and Applications Conference (COMPSAC), Tokyo, Japan, pp. 333–338, Sep. 11–13, 1991.

Yemini et al., "Towards Programmable Networks," IFIP/IEEE International Workshop on Distributed Systems: Operations and Management, L'Aquila, Italy, Oct. 1996.

Yin et al., "Using Leases to Support Server Driven Consistency in Large–Scale Systems," Computer Services Department, University of Texas at Austin, p. 285–294, May 26–28, 1998.

LOOKUP SERVICE

| | | | |
|---|---|---|---|
| SERVICE ITEM 410 | SERVICE ID 1 | STUB 1 | ATTRIBUTES 1 |
| SERVICE ITEM 412 | SERVICE ID 2 | STUB 2 | ATTRIBUTES 2 |
| SERVICE ITEM 414 | SERVICE ID 3 | STUB 3 | ATTRIBUTES 3 |
| SERVICE ITEM 416 | SERVICE ID 4 | STUB 4 | ATTRIBUTES 4 |
| SERVICE ITEM 418 | SERVICE ID 5 | STUB 5 | ATTRIBUTES 5 |
| | ○ ○ ○ | ○ ○ ○ | ○ ○ ○ |

NETWORK PROXY

RELATED APPLICATIONS

This application is a Continuation-In-Part of U.S. patent application Ser. No. 09/044,826, filed on Mar. 20, 1998, which is a Continuation-In-Part of U.S. Pat. application Ser. No. 08/636,706 filed Apr. 23, 1996 now abandoned, which are both incorporated herein by reference.

The following applications are relied upon and are hereby incorporated by reference in this application.

Provisional U.S. Patent Application No. 60/076,048, entitled "Distributed Computing System," filed on Feb. 26, 1998.

U.S. patent application Ser. No. 09/044,923, entitled "Method and System for Leasing Storage," filed on Mar. 20, 1998 now U.S. Pat. No. 6,263,350.

U.S. patent application Ser. No. 09/044,838, entitled "Method, Apparatus, and Product for Leasing of Delegation Certificates in a Distributed System," filed on Mar. 20, 1998 now U.S. Pat. No. 6,247,026.

U.S. patent application Ser. No. 09/044,834, entitled "Method, Apparatus and Product for Leasing of Group Membership in a Distributed System," filed on Mar. 20, 1998 now U.S. Pat. No. 6,421,704.

U.S. patent application Ser. No. 09/044,916, entitled "Leasing for Failure Detection," filed on Mar. 20, 1998 now U.S. Pat. No. 6,016,500.

U.S. patent application Ser. No. 09/044,933, entitled "Method for Transporting Behavior in Event Based System," filed on Mar. 20, 1998 now U.S. Pat. No. 6,463,446.

U.S. patent application Ser. No. 09/044,919, entitled "Deferred Reconstruction of Objects and Remote Loading for Event Notification in a Distributed System," filed on Mar. 20, 1998 now U.S. Pat. No. 6,272,559.

U.S. patent application Ser. No. 09/044,938, entitled "Methods and Apparatus for Remote Method Invocation," filed on March 20, 1998 now U.S. Pat. No. 6,487,607.

U.S. patent application Ser. No. 09/045,652, entitled "Method and System for Deterministic Hashes to Identify Remote Methods," filed on Mar. 20, 1998 now U.S. Pat. No. 6,134,603.

U.S. patent application Ser. No. 09/044,790, entitled "Method and Apparatus for Determining Status of Remote Objects in a Distributed System," filed on Mar. 20, 1998 now U.S. Pat. No. 6,598,094.

U.S. patent application Ser. No. 09/044,930, entitled "Downloadable Smart Proxies for Performing Processing Associated with a Remote Procedure Call in a Distributed System," filed on Mar. 20, 1998 now U.S. Pat. No. 6,393,497.

U.S. patent application Ser. No. 09/044,917, entitled "Suspension and Continuation of Remote Methods," filed on Mar. 20, 1998 now U.S. Pat. No. 6,237,024.

U.S. patent application Ser. No. 09/044,835, entitled "Method and System for Multi-Entry and Multi-Template Matching in a Database," filed on Mar. 20, 1998 now U.S. Pat. No. 6,182,083.

U.S. patent application Ser. No. 09/044,839, entitled "Method and System for In-Place Modifications in a Database," filed on Mar. 20, 1998 now abandoned.

U.S. patent application Ser. No. 09/044,945, entitled "Method and System for Typesafe Attribute Matching in a Database," filed on Mar. 20, 1998 now U.S. Pat. No. 6,578,044.

U.S. patent application Ser. No. 09/044,931, entitled "Dynamic Lookup Service in a Distributed System," filed on Mar. 20, 1998 now U.S. Pat. No. 6,185,611.

U.S. patent application Ser. No. 09/044,939, entitled "Apparatus and Method for Providing Downloadable Code for Use in Communicating with a Device in a Distributed System," filed on Mar. 20, 1998 now U.S. Pat. No. 6,560,656.

U.S. patent application Ser. No. 09/044,932, entitled "Apparatus and Method for Dynamically Verifying Information in a Distributed System," filed on Mar. 20, 1998 now U.S. Pat. No. 6,466,947.

U.S. patent application Ser. No. 09/030,840, entitled "Method and Apparatus for Dynamic Distributed Computing Over a Network," filed on Feb. 26, 1998 now U.S. Pat. No. 6,446,070.

U.S. patent application Ser. No. 09/044,936, entitled "An Interactive Design Tool for Persistent Shared Memory Spaces," filed on Mar. 20, 1998 now abandoned.

U.S. patent application Ser. No. 09/044,934, entitled "Polymorphic Token-Based Control," filed on Mar. 20, 1998 now U.S. Pat. No. 6,438,614.

U.S. patent application Ser. No. 09/044,915, entitled "Stack-Based Access Control," filed on Mar. 20, 1998 now U.S. Pat. No. 6,138,238.

U.S. patent application Ser. No. 09/044,944, entitled "Stack-Based Security Requirements," filed on Mar. 20, 1998 now U.S. Pat. No. 6,226,746.

U.S. patent application Ser. No. 09/044,837, entitled "Per-Method Designation of Security Requirements," filed on Mar. 20, 1998 U.S. Pat. No. 6,282,652.

FIELD OF THE INVENTION

The present invention relates generally to data processing systems and, more particularly, to a network proxy.

BACKGROUND OF THE INVENTION

In modern "enterprise" computing, a number of personal computers, workstations, and other devices such as mass storage subsystems, network printers and interfaces to the public telephony system, are typically interconnected in one or more computer networks. The personal computers and workstations are used by individual users to perform processing in connection with data and programs that may be stored in the network mass storage subsystems. In such an arrangement, the personal computers/workstations, operating as clients, typically download the data and programs from the network mass storage subsystems for processing. In addition, the personal computers or workstations will enable processed data to be uploaded to the network mass storage subsystems for storage, to a network printer for printing, to the telephony interface for transmission over the public telephony system, or the like. In such an arrangement, the network mass storage subsystems, network printers and telephony interface operate as servers, since they are available to service requests from all of the clients in the network. By organizing the network in such a manner, the servers are readily available for use by all of the personal computers/workstations in the network. Such a network may be spread over a fairly wide area, with the personal computers/workstations being interconnected by communication links such as electrical wires or optic fibers.

In addition to downloading information from servers for processing, a client, while processing a program, can remotely initiate processing by a server computer of particular routines and procedures (generally "procedures"), in connection with certain "parameter" information provided by the client. After the server has processed the procedure, it will provide results of its processing to the client, which the client may thereafter use in its processing operations. Typically in such "remote procedure calls" the program will make use of a local "stub" which, when called, transfers the request to the server which implements the particular procedure, receives the results and provides them to the program. Conventionally, the stub must be compiled with the program, in which case the information needed to call the remote procedure must be determined at compile time, rather than at the time the program is run. Since the stub available to the client's programs is static, it may be at best the closest that can be determined should be provided for the program when it (the program) is compiled. Accordingly, errors and inefficiencies can develop due to mismatches between the stub that is provided to a program and the requirements of the remote procedure that is called when the program is run.

SUMMARY OF THE INVENTION

A new and improved system and method for facilitating the obtaining and dynamic loading of a stub is provided to enable a program operating in one address space to remotely invoke processing of a method or procedure in another address space, so that the stub can be loaded by the program when it is run and needed, rather than being statically determined when the program is compiled. Indeed, the stub that is loaded can be obtained from the resource providing the remote method or procedure, and so it (the stub) can exactly define the invocation requirements of the remote method or procedure. Since the stub can be located and dynamically loaded while the program is being run, rather than being statically determined when the program is compiled, run-time errors and inefficiencies which may result from mismatches between the stub that is provided and the requirements of the remote method or procedure that is invoked can be minimized. In an alternative embodiment of the present invention, the stub is obtained from a lookup service to provide access to a service defined in the lookup service.

In brief summary, methods and systems consistent with an alternative embodiment of the present invention facilitate access to a service via a lookup service. A lookup service defines a network's directory of services and stores references to these services. A client desiring use of a service on the network accesses the lookup service, which returns the stub information that facilitates the user's access of the service. The client uses the stub information to access the service.

In a second alternative embodiment of the present invention, a network proxy is provided that facilitates the integration of orphan services into a network by enabling them to interact with a lookup service that contains an indication of the services that are available on the network. In this respect, the lookup service acts like a service registry. These orphan services typically reside on devices having too little memory to run the components necessary to be integrated into the network. Thus, the network proxy acts as a go between, by registering the orphan services with the lookup service so that clients may access them and by accessing services on behalf of the orphan services. As a result, the network proxy integrates orphan services into the network when they otherwise would be incapable of doing so.

In accordance with methods consistent with the present invention, a method is provided in a data processing system including a service on a device, a service registry, and a proxy. According to this method, the proxy receives a request from the service to register with the service registry, obtains information that facilitates accessing the service, and stores the information into the service registry.

In accordance with methods consistent with the present invention, a method for registering a service located on a device in a service registry is provided in a data processing system. According to this method, the service sends a request for registration in the service registry to a proxy server, whereupon the proxy server registers the service in the service registry to enable a client program to access the service, and the service receives a request from the client program for accessing the service.

In accordance with methods consistent with the present invention, a method is provided in a data processing system including a client program, a service registry containing a reference to a service on a device, and a proxy server. According to this method, the client program retrieves the reference from the service registry and uses the reference to send a request to access the service to the proxy server.

In accordance with systems consistent with the present invention, a data processing system is provided. The data processing system comprises a lookup server, a device, and a proxy server. The lookup server includes a memory with a lookup service containing registrations that facilitate access to corresponding services and includes a processor for running the lookup service. The device includes a memory containing an orphan service that requests registration in the lookup service and includes a processor for running the orphan service. The proxy server includes a memory containing a network proxy that receives the registration request from the orphan service and that registers the orphan service in the lookup service and includes a processor for running the network proxy.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 4 is a diagram illustrating a lookup service consistent with the present invention;

DETAILED DESCRIPTION OF AN ILLUSTRATIVE EMBODIMENT

Figure 1:
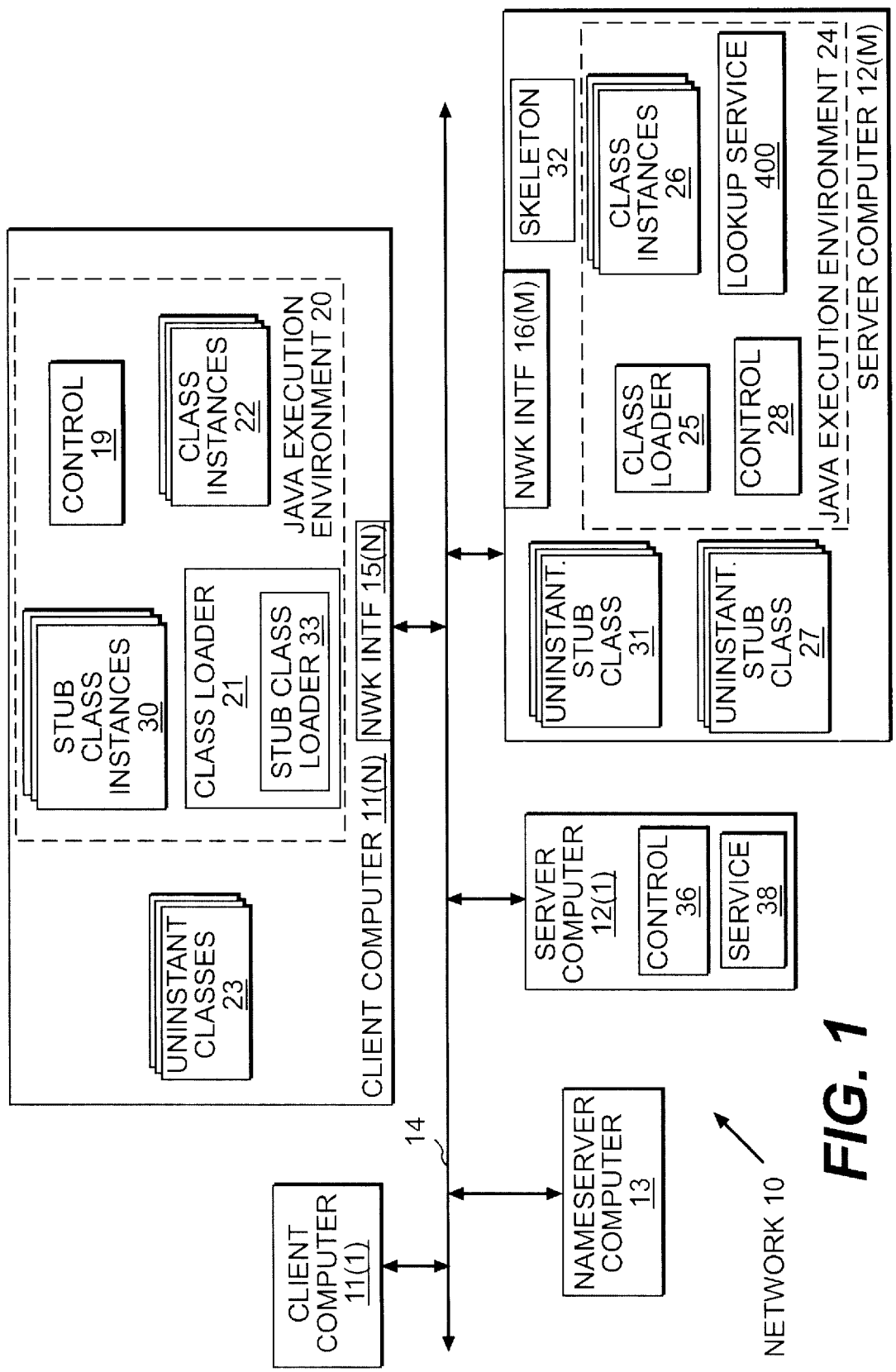
FIG. 1 is a function block diagram of a computer network including an arrangement constructed in accordance with the present invention for facilitating the obtaining, dynamic loading and use of "stub" information to enable a program operating in one address space to invoke processing of a remote method or procedure in another address space.

FIG. 1 is a schematic diagram of a computer network 10 including an arrangement for facilitating dynamic loading of "stub" information to enable a program operating in one address space to remotely invoke processing of a method or procedure in another address space, where this method or procedure represents a network service. With reference to FIG. 1, computer network 10 includes a plurality of client computers 11(1) through 11(N) (generally identified by reference numeral 11(n)), a plurality of server computers 12(1) through 12(M) (generally identified by reference numeral 12(m)), all of which are interconnected by a network represented by a communication link 14. In addition, the network 10 may include at least one nameserver computer 13, which may also be connected to communication link 14, whose purpose will be described below. As is conventional, at least some of the client computers 11(n) are in the form of personal computers or computer workstations, each of which typically includes a system unit, a video display unit and operator input devices such as a keyboard and mouse (all of which are not separately shown). The server computers 12(m) and nameserver computer 13 also typically include a system unit (also not separately shown), and may also include a video display unit and operator input devices.

The client computers 11(n), server computers 12(m) and nameserver computer 13 are all of the conventional stored-program computer architecture. A system unit generally includes processing, memory, mass storage devices such as disk and/or tape storage elements and other elements (not separately shown), including network interface devices 15(n), 16(m) for interfacing the respective computer to the communication link 14. The video display unit permits the computer to display processed data and processing status to the operator, and an operator input device enables the operator to input data and control processing by the computer. The computers 11(n) and 12(m) and 13 transfer information, in the form of messages, through their respective network interface devices 15(n), 16(m) among each other over the communication link 14.

In one embodiment, the network 10 is organized in a "client-server" configuration, in which one or more computers, shown in FIG. 1 as computers 12(m), operate as servers, and the other computers, shown in FIG. 1 as computers 11(n) operate as clients. In one aspect, one or more of the server computers 12(m) may, as "file servers," include large-capacity mass storage devices which can store copies of programs and data which are available for retrieval by the client computers over the communication link 13 for use in their processing operations. From time to time, a client computer 11(n) may also store data on the server computer 12, which may be later retrieved by it (the client computer that stored the data) or other client computers for use in their processing operations. In addition, one or more of the server computers 12(m) may, as "compute servers," perform certain processing operations in response to a remote request therefor from a client computer 11(n), and return the results of the processing to the requesting client computer 11(n) for use by them (that is, the requesting client computers 11(n)) in their subsequent processing. In either case, the server computers may be generally similar to the client computers 11(n), including a system unit, video display unit and operator input devices and may be usable by an operator for data processing operations in a manner similar to a client computer. Alternatively, at least some of the server computers may include only processing, memory, mass storage and network interface elements for receiving and processing retrieval, storage or remote processing requests from the client computers, and generating responses thereto. It will be appreciated a client computer 11(n) may also perform operations described herein as being performed by a server computer 12(m), and similarly a server computer 12(m) may also perform operations described herein as being performed by a client computer 11(n).

The network represented by communication link 14 may comprise any of a number of types of networks over which client computers 11(n), server computers 12(m) and nameserver computers 13 may communicate, including, for example, local area networks (LANs) and wide area networks (WANs) which are typically maintained within individual enterprises, the public telephony system, the Internet, and other networks, which may transfer digital data among the various computers. The network may be implemented using any of a number of communication media, including, for example, wires, optical fibers, radio links, and/or other media for carrying signals representing information among the various computers depicted in FIG. 1. As noted above, each of the computers typically includes a network interface which connects the respective computer to the communications link 14 and allows it to transmit and receive information thereover.

Systems consistent with the present invention facilitate the obtaining and dynamic loading of "stub" information to enable a program operating in one address space to invoke processing of a remote method or procedure in another address space, which may be located on the same computer as the invoking program or on a different computer. Reference will be made to programs provided in the Java™ programming language, as described in James Gosling, Bill Joy, Guy Steele, "The Java™ Language Specification", Addison-Wesley, 1996, (hereinafter referred to as the "Java language specification"), incorporated herein by reference, which are processed in connection with an execution environment which is provided by a Java virtual machine. The Java virtual machine, in turn, is specified in the Lindholm and Yellin, "The Java Virtual Machine Specification", Addison-Wesley, 1996, incorporated herein by reference. As described in the Java language specification, programs in the Java programming language define "classes" and "interfaces." Classes are used to define one or more methods or procedures, each of which may be invoked by reference to an interface. A class may be associated with and extend a "super-class," and in that regard will incorporate all of the interfaces and methods of the super-class, and may also include additional interfaces and/or methods. A class may also have one or more sub-classes (and thus will comprise a super-class of each of its sub-classes), with each sub-class incorporating and possibly extending their respective super-classes.

An interface provides a mechanism by which a set of methods may be declared. In that connection, an interface identifies each method that is declared by the interface by, for example, a name, identities the data type(s) of argument (s) that are to be provided for the method, the data type(s) of return values that are to be returned by the method, and identifiers for exceptions which can be thrown during processing of the method. A class may indicate that it implements a particular interface, and in that connection will include the program code which will be used in processing all of the methods which are declared in the interface. In addition, different classes may indicate that they implement the same interface, and each will have program code which will be used in processing all of the methods which are declared in the interface, but the program code provided in each class to for use in processing the methods may differ from the program code provided in the other classes which is used in processing the same methods; thus, an interface provides a mechanism by which a set of methods can be declared without providing an indication of the procedure which will be used in processing any of the methods. An interface may be declared independently of the particular class which implements the method or methods which can be invoked using the interface. In that regard, a class that invokes the method and a class that actually implements the method will not need to share a common super-class.

During processing of a Java program, as described in the Java virtual machine specification, a client computer $11(n)$ provides an execution environment 20 for interpreting the Java program. The Java virtual machine includes a class loader 21 that, under control of a control module 19, can dynamically link instances of classes, generally identified in FIG. 1 by reference numeral 22, into the running program's execution environment while the program is being executed. In that operation, the control module 19 effectively enables the class loader to retrieve uninstantiated classes, which generally identified by reference numeral 23, instantiate them and link them as class instances 22 into the execution environment's address space at the Java program's run time as the methods which the respective classes 23 implement are called. In addition, the class loader 21 can discard ones of the class instances 22 when they are not needed or to conserve memory. It will be appreciated that, if a class instance 22 has been discarded, it may be reloaded by the class loader 21 at a later point if it is then needed.

Systems consistent with the present invention provide an arrangement which facilitates the remote invocation, by a program executing in an execution environment 20 by a client computer $11(n)$, of methods implemented by classes on a server computer $12(m)$. In executing a method, the server computer $12(m)$ will also provide an execution environment 24 for processing, under control of a control module 28, the Java method. In that operation, the Java virtual machine which provides the execution environment 21 includes a class loader 25 (which may be similar to the class loader 21) that, under control of the control module 28, can dynamically link an instance of the class 26, to enable the method to be processed in the execution environment 24, and instances of other classes (also generally represented by reference numeral 26) which may be needed to process the remotely-invoked method. In that operation, the control module 28 effectively enables the class loader 25 to retrieve an uninstantiated class for the method to be invoked, from a plurality of uninstantiated classes which are generally identified by reference numeral 27, instantiate it (that is, the uninstantiated class which provides the method to be invoked) and link it as a class instance 26 into the execution environment. In addition, the class loader 25 can discard the class instances 26 when processing of the method has terminated. It will be appreciated that, if class instances 26 has been discarded, it may be reloaded by the class loader 25 at a later point if it is then needed.

The structure of nameserver computer 13, if provided, is generally similar to that of the server computer $12(m)$, and will not be separately described.

To facilitate remote invocation of a method, the control module 19 of the client computer's execution environment 21 makes use of one or more stub class instances generally identified by reference numeral 30 which are provided as part of the execution environment 21 in which the various class instances 22, including the class instance which is invoking the remote method, are being processed. Each stub class instance 30 is an instance of an uninstantiated stub class 31, which the server computer $12(m)$ may maintain for the various class instances 26 and uninstantiated classes 27 which the server computer $12(m)$ has "exported," that is, which the server computer $12(m)$ makes available to client computers $11(n)$ for use in remote invocation of methods provided thereby. An uninstantiated stub class 31 includes declarations for the complete set of interfaces for the particular remote uninstantiated class 27 which implements the remote method to be invoked, and also provides or invokes methods which facilitate accessing of the remote method(s) which are implemented by the remote class. The uninstantiated stub class 31, when it is instantiated and provided to the execution environment 20 of the client computer $11(n)$ as a stub class instance 30, effectively provides the information which is needed by the control module 19 of the execution environment 20 of the invoking Java program, so that, when a remote method that is implemented by its associated class is invoked by a Java program running in a particular execution environment, the remote method will be processed and the return value(s) provided to the invoking Java program. In one embodiment, the arrangement by which the stub class instance may be provided to the execution environment 20 is similar to that described in the aforementioned Waldo, et al., patent application.

In addition, the server computer $12(m)$ provides a skeleton 32, which identifies the particular classes and methods which have been exported by the server computer $12(m)$ and information as to how it (that is, the server computer $12(m)$) may load the respective classes and initiate processing of the particular methods provided thereby. Additionally, the server computer $12(m)$ contains a lookup service 400 for registering services on a network. The lookup service 400 will be discussed below.

When a class instance invokes a remote method maintained by a server computer $12(m)$, it will provide values for various parameters to the stub class instance 30 for the remote method, which values the remote method will use in its processing. If the remote method is implemented on the same computer as the invoking Java program, when the invoking Java program invokes a remote method, the computer may establish an execution environment, similar to the execution environment 20, enable the execution environment's class loader to load and instantiate the class which implements the method as a class instance similar to class instances 22, and process the remote method using values of parameters which are provided by the invoking class instance in the remote invocation. After processing of the method has been completed, the execution environment in which the remote method has been processed will provide the results to the stub class instance 30 for the remote method that was invoked, which, in turn, will provide to the particular class instance 22 which invoked the remote method.

Similar operations will be performed if client computer 11(n) and server computer 12(m) are implemented on different physical computers. In that case, in response to a remote invocation, the client computer 11(n) that is processing the invoking class instance 22, under control of the control module 19 for the execution environment 20 for the invoking class instance 22, will use the appropriate stub class instance 30 to communicate over the network represented by the communication link 14 with the server computer 12(m) which implements the remote method to enable it (that is, the server computer 12(m)) to establish an execution environment 24 for the class which implements the remote method, and to use the class loader 25 to load an instance of the class as a class instance 26. In addition, the client computer 11(n), also using the appropriate stub class instance 30, will provide any required parameter values to the server computer 12(m) over the network 14. Thereafter, the server computer 12(m) will process the remote method using parameter values so provided, to generate result value(s) which are transferred over the network to the client computer 11(n), in particular to the appropriate stub class instance 30. The client computer 11(n) will, after it receives the result value(s) from the network, provide them to the invoking class instance 22 for its processing.

In any case, when the control module 19 of the client computer's execution environment 20 determines that a reference to the remote object has been received, if it determines that the stub class instance 30 is not present when it receives the reference, it will attempt to obtain the stub class instance 30 from, for example, the server computer 12(m) which implements the remote method, and enable the stub class instance 30 to be dynamically loaded in the execution environment 20 for the invoking class instance 22. A reference to the remote object may be received, for example, either as a return value of another remote method invocation or as a parameter that is received during another remote method invocation. The stub class instance may be dynamically loaded into the execution environment in a manner similar to that used to load class instances 22 in the execution environment 22. The execution environment 20 is provided with a stub class loader 33 which, under control of the control module 19, will attempt to find and load the stub class instances 30 as required by the class instances 22 processed in the execution environment. The location of a particular server computer 12(m) that maintains the class that implements a method to be invoked remotely may be included in the call from the invoking class instance or may be made known to the stub class loader 33 through another mechanism (not shown) maintained by the client computer 11(n).

However, if the stub class loader 33 is not otherwise notified of which server computer 12(m) maintains the class which implements a method which may be invoked remotely, it may use the nameserver computer 13 to provide that identification. The identification may comprise any identifier which may be used to identify a server computer 12(m) or other resource which is available on the network 14 and to which the server computer 12(m) can respond. Illustrative identifiers include, for example, a network address which identifies the server computer and/or resource, or, if the network 14 is or includes the Internet, an identifier to, for example, a World Wide Web resource which may provide the identification or a "uniform resource locator" ("URL") which provides a uniform mechanism for identifying resources that are available over the Internet. The server computer 12(m) which implements the remote method, in response to a request from the client computer 11(n) will provide stub class instance 30 which the client computer 11(n) may load into the execution environment 21 to thereafter enable the remote invocation to be initiated.

As noted above, if the stub class loader 33 does not know which server computer 12(m) implements the remote method which may be invoked (and thus does not know which computer is to provide the stub class code for the remote invocation), it may, under control of the control module 19, obtain the identification from the nameserver computer 13. In that operation, the stub class loader 33 may use a previously-provided default stub class which is provided for use in such cases. The default class stub, when used by the invoking Java program, enables the computer that is processing the invoking Java program to communicate with the nameserver computer 13 to obtain information which can be used in invoking the remote method. This operation is essentially the same as the invocation of a remote method to be processed by the nameserver computer 13, with the remote method including a parameter identifying the class and method to be remotely invoked, and enabling the nameserver computer 13 to provide the identification of a server computer 12(m) which can process the method to the requesting client computer 11(n) and other information which may be helpful in communicating with the server computer 12(m) and invoking the particular method. It will be appreciated that the nameserver computer 13 will maintain a table (not separately shown) of "exported" resources, that is, resources, such as classes and methods, that are available to client computers 11(n) connected to the network 14, and information, such as the identifications of the particular server computers 12(m) which provide those resources, which will be useful to the client computers 11(n) in making use of the exported resources.

It will be appreciated that the nameserver computer 13 may create and maintain the exported resource table in a number of ways that are known in the art. For example, the nameserver computer 13 may periodically broadcast requests for exported resource information over the network 14, to which the various server computers 12(m) which maintain exported resources may respond; in that case, the nameserver computer 13 may establish its exported resource table based on the responses from the server computers 12(m). Alternatively, each of the various server computers 12(m) which maintains an exported resource may periodically broadcast information as to the exported resources which it maintains, and the nameserver computer 13 can update its exported resource table based on the broadcasts from the server computer. In addition, the nameserver computer's exported resource table may be established by a system operator and may be fixed until he or she updates it.

In any case, the information provided by the nameserver computer 13 in response to a request initiated by the default stub would include such information as, for example, the identification of a computer 12(m) which can provide a class which implements the remote method to be invoked, particular information which the computer (that is, the computer which implements the remote method) will require to provide the required stub class code, and the like. After receiving the information from the nameserver computer 13, the computer 11(n) that is processing the invoking Java program may, under control of the control module 19, use the information communicate with the computer (that is, the computer which implements the remote method) to obtain the stub class, and may thereafter invoke the method as described above.

Figure 2A:
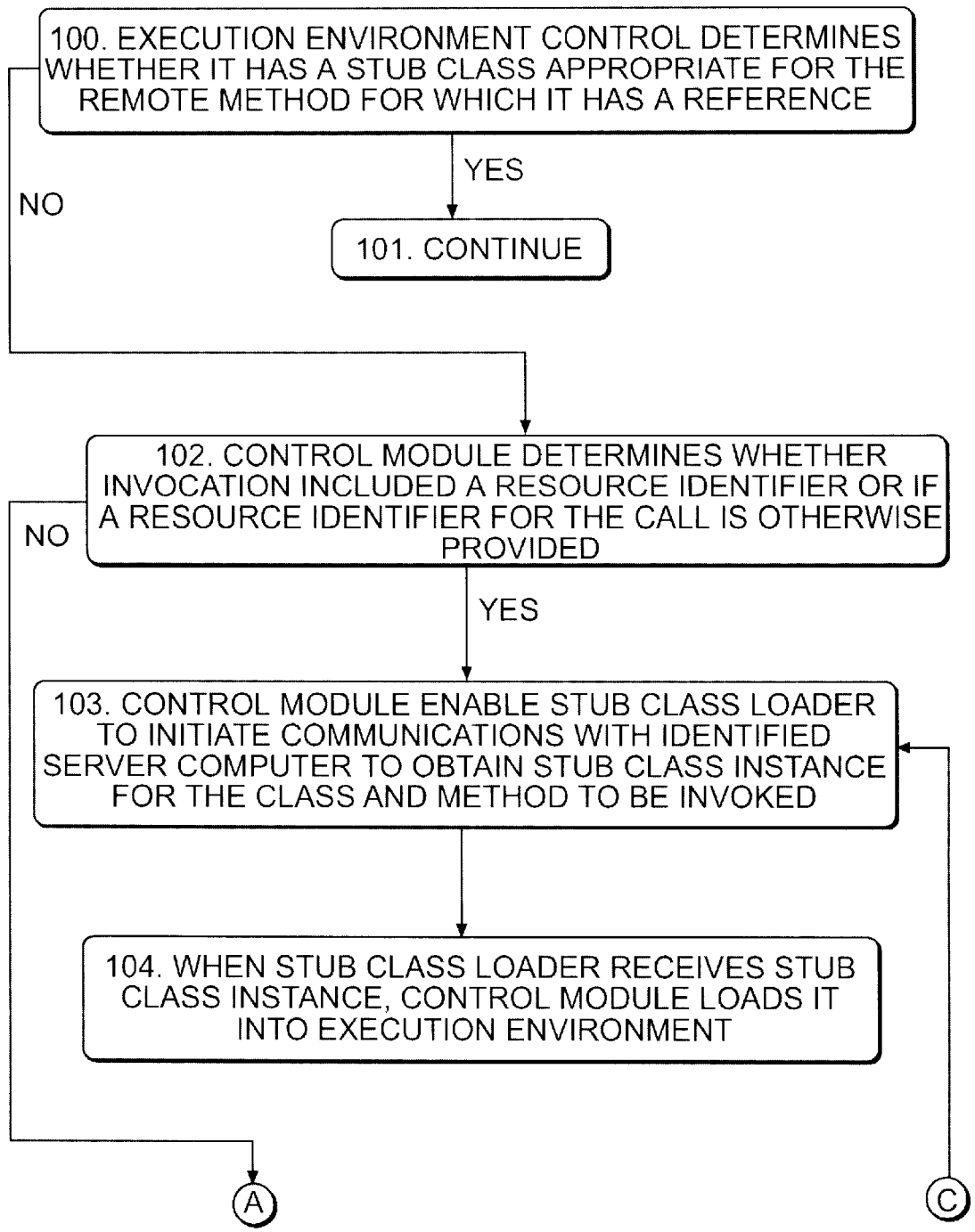
FIGS. 2 and 3 are flow charts depicting the operations performed by the arrangement depicted in FIG. 1, with FIG. 2 depicting operations performed in connection with obtaining and dynamic loading of the stub information and FIG. 3 depicting operations performed in connection with use of the stub information to invoke processing of the remote method or procedure.
Figure 2B:
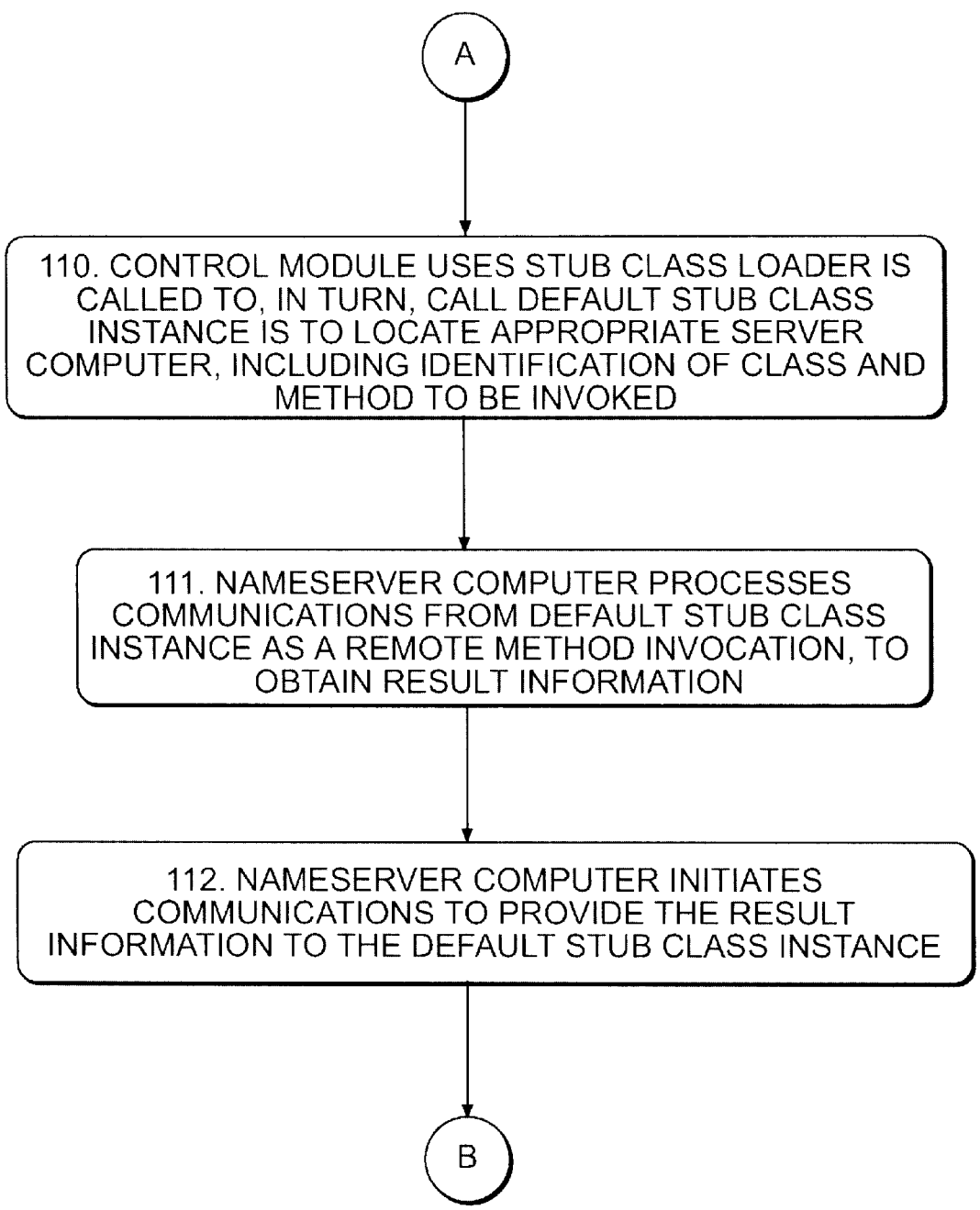
Figure 2C:
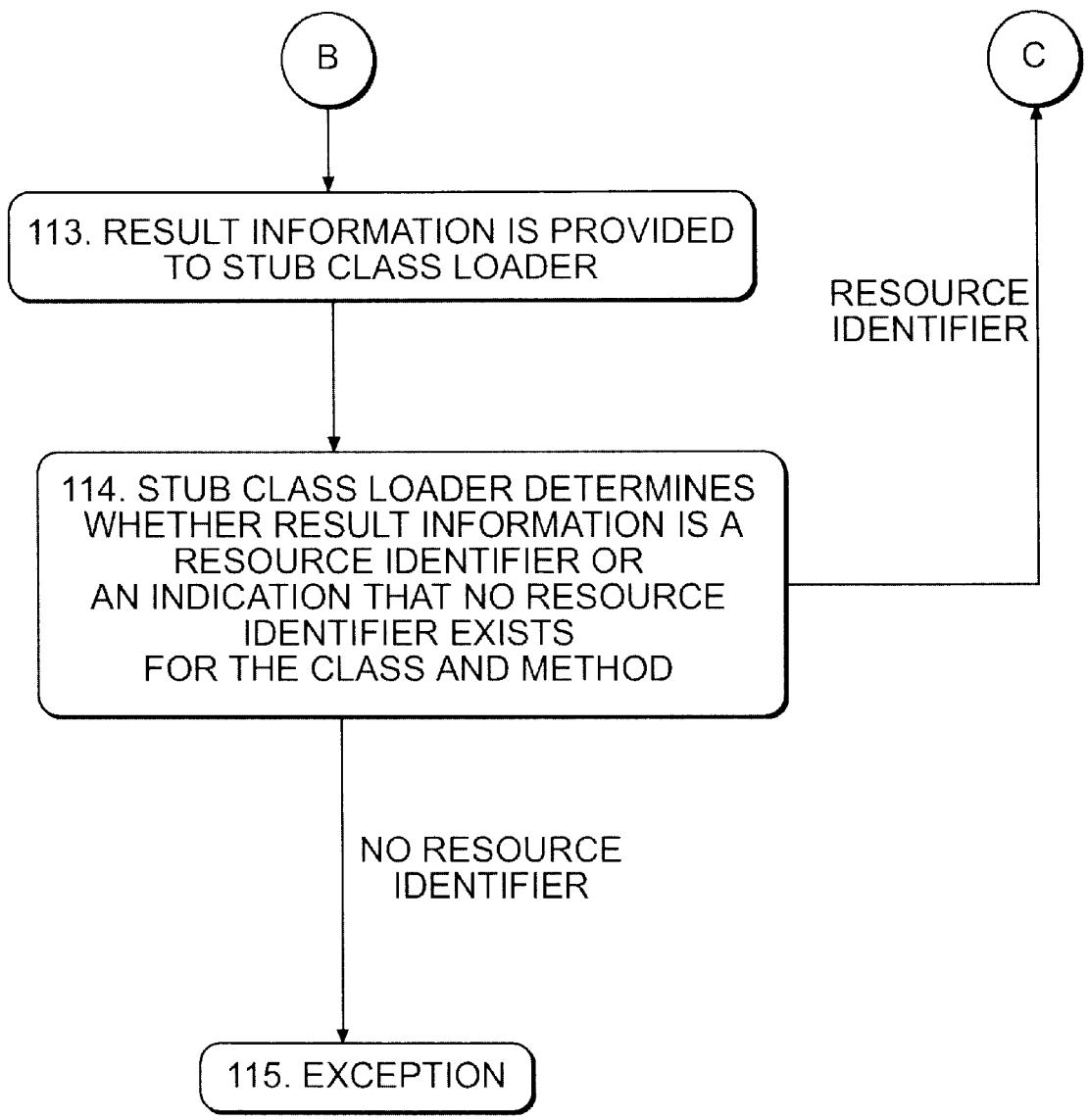

With this background, the operations performed by client computer 11(n), server computer 12(m) and, if necessary, nameserver 13 in connection with obtaining and dynamic loading of a stub class instance when a reference to a remote method is received will be described in connection with the flow chart depicted in FIG. 2. In addition, operations performed by the client computer 11(*n*) and server computer in connection with remote invocation of a method using the stub class instance will be described in connection with the flow chart depicted in FIG. 3. With reference initially to FIG. 2, the execution environment control module 19 will, when it receives a reference to a remote method, will initially determine whether an appropriate stub class instance is present in the execution environment 20 to facilitate invocation of the remote method (step 100). If the control module 19 determines that such a stub class instance 30 for the remote method is present in the execution environment, it may continue other operations (step 101). However, if the control module 19 determines in step 101 that such a stub class instance is not present in the execution environment 20 for the remote method, the control module 19 will use the stub class loader 33 to attempt to locate and load a stub class instance 30 for the class to process the remote method. In that case, the control module 19 will initially determine whether the invocation from the class instance 22 included a resource locator to identify the server computer 12(*m*) or other resource which maintains the class for the method to be invoked, or whether it (that is, the control module 19) or the stub class loader 33 otherwise are provided with such a resource locator (step 102). If the control module 19 makes a positive determination in that step, it will sequence to step 103 to enable the stub class loader 33 to initiate communications with identified server computer 12(*m*) to obtain stub class instance for the class and method to be invoked (step 103). When the stub class loader 33 receives the stub class instance 30 from the server computer 12(*m*), it will load the stub class instance 30 into execution environment 20 for the class instance 22 which initiated the remote method invocation call in step 100 (step 104). After the stub class instance 30 for the referenced remote method has been loaded in the execution environment, the method can be invoked as will be described below in connection with FIG. 3.

Returning to step 102, if the control module 19 determines that the invocation from the class instance 22 did not include a resource locator to identify the server computer 12(*m*) or other resource which maintains the class for the method to be invoked, and further that it (that is, the control module 19) or the stub class loader 33 is not otherwise provided with such a resource locator, a "class not found" exception may be indicated, at which point the control module 19 may call an exception handler. The exception handler may perform any of a number of recovery operations, including, for example, merely notifying the control module 19 that the remote method could not be located and allow it to determine subsequent operations.

Alternatively, the control module 19 may attempt to obtain a resource locator from the nameserver computer 13 or other resource provided by the network 14 (generally represented in FIG. 1 by the nameserver computer 13), using a call, for example, a default stub class instance 30. The call to the default stub class instance 30 will include an identification of the class and method to be invoked and the name of the nameserver computer 13(*m*). Using the default stub class instance 30, the control module 19 will enable the computer 11(*n*) to initiate communications with nameserver computer 13 to obtain an identifier for a server computer 12(*m*) which maintains the class and method to be invoked (step 110). The communications from the default stub class instance 30 will essentially correspond to a remote method invocation, with the method enabling the nameserver computer to provide the identification for the server computer 12(*m*), if one exists associated with the class and method to be remotely invoked, or alternatively to provide an indication that no server computer 12(*m*) is identified as being associated with the class and method. During the communications in step 110, the default stub class interface 30 will provide, as a parameter value, the identification of class and method to be invoked.

In response to the communications from the default stub class instance 30, the nameserver computer 13 will process the request as a remote method (step 111), with the result information comprising the identification for the server computer 12(*m*), if one exists that is associated with the class and method to be remotely invoked, or alternatively an indication that no server computer 12(*m*) is identified as being associated with the class and method. After finishing the method, the nameserver computer 13 will initiate communications with the default stub class instance 30 to provide the result information to the default stub class instance 30 (step 112).

After receipt of the result information from the nameserver computer 13, the default stub class instance, under control of the control module 19, will pass result information to the stub class loader 33 (step 113). Thereafter, the stub class loader 33 determines whether the result information from the nameserver computer comprises the identification for the server computer 12(*m*) or an indication that no server computer 12(*m*) is identified as being associated with the class (step 114). If the stub class loader 33 determines that the result information comprises the identification for the server computer 12(*m*), it (that is, the stub class loader 33) will return to step 101 to initiate communication with the identified server computer 12(*m*) to obtain stub class instance for the class and method that may be invoked. On the other hand, if the stub class loader 33 determines in step 114 that the nameserver computer 13 had provided an indication that no server computer 12(*m*) is identified as being associated with the class and method that may be invoked, the "class not found" exception may be indicated (step 115) and an exception handler called as described above.

Figure 3A:
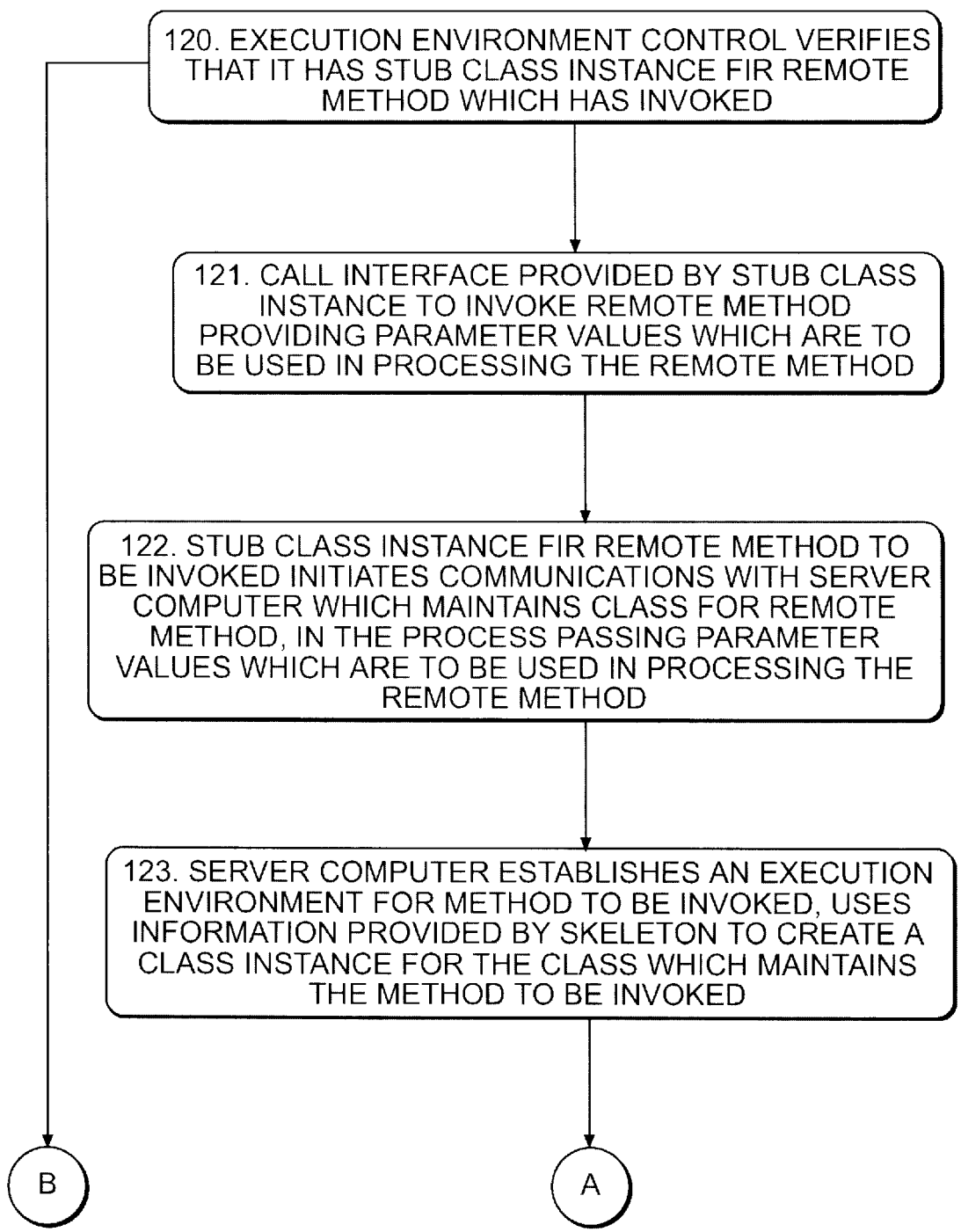
Figure 3B:
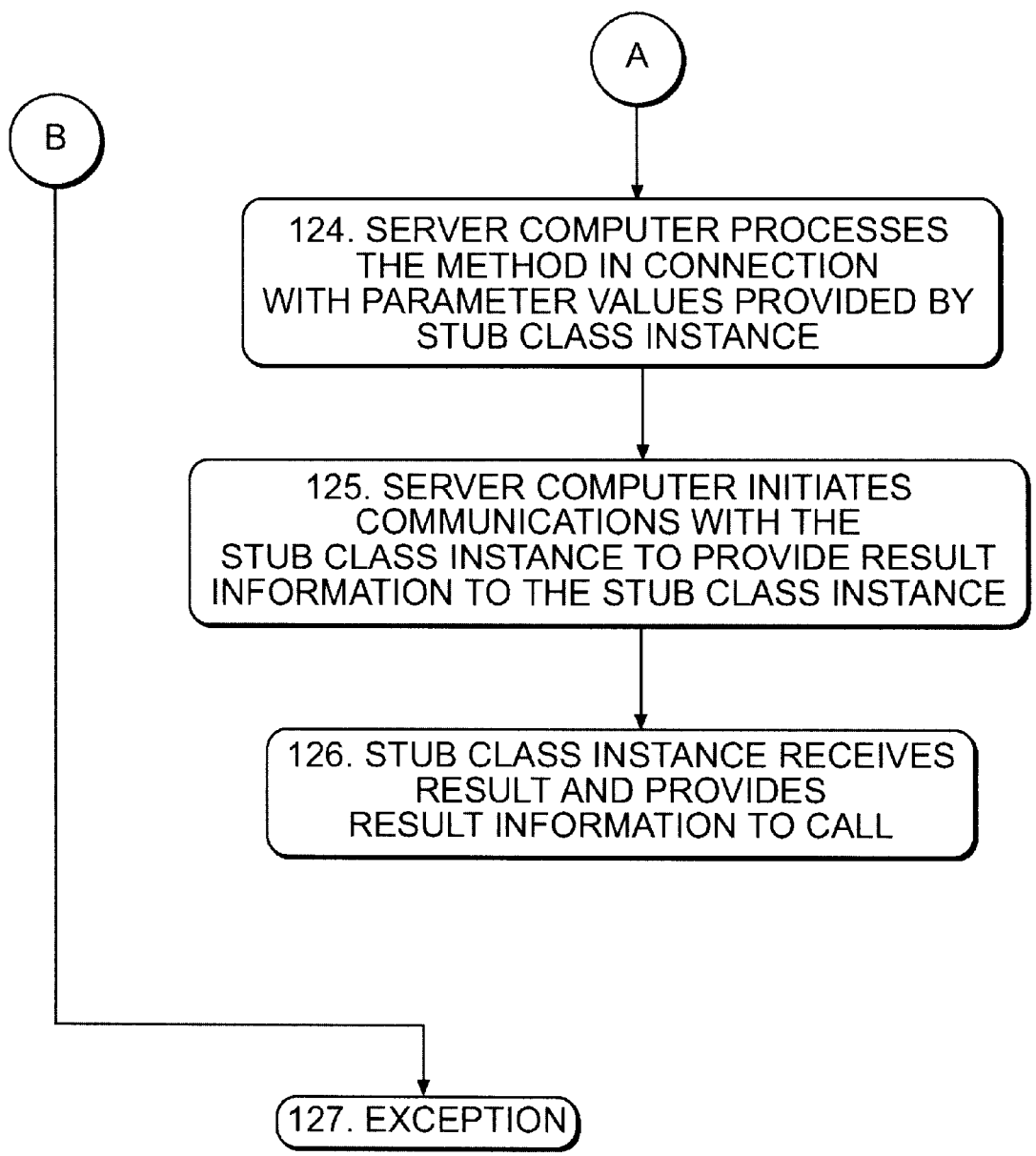

As noted above, the stub class instance 30 retrieved and loaded as described above in connection with FIG. 2 may be used in remote invocation of the method. Operations performed by the client computer 11(*n*) in connection with remote invocation of the method will be described in connection with the flow chart in FIG. 3. As depicted in FIG. 3, when a class instance 22 invokes a method, the control module 19 may initially verify that a stub class instance 30 is present in the execution environment for remote method to be invoked (step 120). If a positive determination is made in step 120, the stub class instance 30 will be used for the remote invocation, and in the remote invocation will provide parameter values which are to be used in processing the remote method (step 121). Thereafter, the stub class instance 30 for the remote method that may be invoked will be used to initiate communications with the server computer 12(*m*) which maintains the class for the remote method (step 122), in the process, the passing parameter values which are to be used in processing the remote method will be passed. It will be appreciated that, if the server computer 12(*m*) which is to process the method is the same physical computer as the client computer 12(*n*) which is invoking the method, the communications can be among execution environments which are being processed within the physical computer. On the other hand, if the server computer 12(*m*) which is to process the method is a different physical computer from that of the client computer 12(*n*) which is invoking the method, the communications will be through the client computer's and server computer's respective network interfaces 15(*n*) and 16(*m*) and over the network 14.

In response to the communications from the stub class instance in step 122, the server computer 12(*m*), if necessary establishes an execution environment 24 for the class which maintains the method that may be invoked, and the uses the information provided by the skeleton 32 to create a class instance 26 for that class (step 123). Thereafter, the server computer 12(*m*), under control of the control module 28, will process the method in connection with parameter values that were provided by stub class instance 30 (step 124). After completing processing of the method, the server computer 12(*m*), also under control of the control module 28, will initiate communications with the client computer's stub class instance 30 to provide result information to the stub class instance (step 125). In a manner similar to that described above in connection with step 102, if the server computer 12(*m*) which processed the method is the same physical computer as the client computer 12(*n*) which invoked the method, the communications can be among execution environments 24 and 20 which are being processed within the physical computer. On the other hand, if the server computer 12(*m*) which processed the method is a different physical computer from that of the client computer 12(*n*) which is invoking the method, the communications will be through the server computer's and client computer's respective network interfaces 16(*m*) and 15(*n*) and over the network 14. After the stub class instance 30 receives the result information from the server computer, it may provide result information to the class instance 22 which initiated the remote method invocation (step 126), and that class instance 22 can continue processing under control of the control module 19.

Returning to step 120, if the control module 19 determines in that step that it does not have a stub class instance 30 that is appropriate for the remote method that may be invoked, it may at that point call an exception handler (step 127) to perform selected error recovery operations.

Methods and systems consistent with the present invention provide a number of advantages. In particular, they provide a new system and method for facilitating dynamic loading of a stub which enables a program that is operating in one execution environment to remotely invoke processing of a method in another execution environment, so that the stub can be loaded by the program when it is run and needed. In systems in which stubs are compiled with the program, and thus are statically determined when the program is compiled, they (the stubs) may implement subsets of the actual set of remote interfaces which are supported by the remote references that is received by the program, which can lead to errors and inefficiencies due to mismatches between the stub that is provided to a program and the requirements of the remote procedure that is called when the program is run. However, since, in the dynamic stub loading system and method, the stub that is loaded can be obtained from the particular resource which provides the remote method, it (the stub) can define the exact set of interfaces to be provided to the invoking program at run time, thereby obviating run-time incompatibilities which may result from mismatches between the stub that is provided and the requirements of the remote method that is invoked.

It will be appreciated that a number of modifications may be made to the arrangement as described above. For example, although the execution environment 20 has been described as obtaining and loading stub class instances to facilitate invocation of remote methods when references to the remote methods are received, it will be appreciated that stub class instances may instead be obtained and loaded when the remote methods are initially invoked. Obtaining and loading of the stub class instance for a remote method when a reference thereto is received will have the advantages that (I) the stub class instance will be present in the execution environment when the remote method is actually invoked, and (ii) if the appropriate stub class instance can not be located, the program or an operator may be notified at an early time. On the other hand, obtaining and loading of the stub class instance for a remote method when the method is to be invoked may result in a delay of the invocation until the correct stub class instance can be found, if the method is in fact not invoked even if a reference to it is received the stub class instance may not need to be located and loaded.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

Alternative Embodiment of the Present Invention

Although an embodiment consistent with the present invention has been previously described that dynamically retrieves and loads stubs, an alternative embodiment also consistent with the present invention loads and retrieves objects in a lookup service, where the objects contain code (stub information) for facilitating communication with a particular service or the objects contain code that performs the service. Although the alternative embodiment is described below as downloading objects from the lookup service that represent stubs, the techniques described below are equally applicable to downloading objects that actually perform the services. A lookup service defines a network's directory of services and stores references to these services. A user desiring use of a service on the network accesses the lookup service, which returns the stub information that facilitates the user's access of the service.

The lookup service may contain a subset of all services available in the network, referred to as a "Djinn" as described in copending U.S. patent application Ser. No. 09/044,931, entitled "Dynamic Lookup Service in a Distributed System," assigned to a common assignee, filed on even date herewith, which has been previously incorporated by reference. A "Djinn" refers to a logical grouping of one or more of the services or resources that are provided by a network. Devices connected to the network may either dynamically add themselves to the Djinn or dynamically remove themselves from the Djinn. When added, a device provides zero or more of its services to the Djinn and may utilize all of the services currently provided by the Djinn. The services provided by the Djinn are defined by the lookup service, which provides a common way to both find and utilize the services for the Djinn.

The lookup service is a fundamental part of the infrastructure for a Djinn or other computer network offering a range of services. It is the primary means for programs to find services available within the Djinn and is the foundation for providing stubs through which users and administrators can discover and interact with services in the Djinn.

Reference will now be made to FIG. 4, which depicts lookup service 400 in greater detail. Server computer 12(m), also includes a lookup service 400, further described below. The lookup service 400, located on a server 12(m) as shown in FIG. 1, maintains a collection of "service items" 410–418. Each service item 410–418 represents an instance of a service available within the Djinn, and each service item 410 contains a service ID 402 that uniquely identifies the service item, a stub 404 providing code that programs use to access the service, and a collection of attributes 406 that describe the service.

Upon registering a new service with the lookup service 400, the lookup service gives the new service item 410 a unique service ID 402, typically a number. This service ID 402 can later be used to access the specific service, avoiding unnecessary searching or locating several matching service items upon a query.

When a new service is created (e.g., when a new device is added to the Djinn), the service registers itself with the lookup service 400, providing a stub 404 to be used by a client to access the service and an initial collection of attributes 406 associated with the service. For example, a printer might include attributes indicating speed (in pages per minute), resolution (in dots per inch), color, and whether duplex printing is supported. The lookup service administrator (not shown) might also add new attributes, such as the physical location of the service and common names for it. Additionally, if a service encounters some problem that needs administrative attention, such as a printer running out of toner, the service can add an attribute that indicates what the problem is. In one implementation consistent with the present invention, attributes are stored as multi-entries, and the addition, modification and deletion of attributes can be made using multi-templates and the techniques explained in co-pending U.S. patent application Ser. No. 09/044,839, entitled "Method and System for In-Place Modifications In A Database", previously incorporated herein.

An individual set of attributes is represented as an instance of a class, each attribute being a field of that class. An example of an attribute set for a printer is:

```
public class Printer {
    Integer ppm;      //  pages per minute
    Integer dpi;      //  resolution in dots per inch
    Boolean duplex;   //  supports two-sided printing
    Boolean color;    //  color or black-only
}
```

The class provides strong typing of both the set and the individual attributes.

The attributes 406 of service items 410 can also be represented as a set of sets of attributes. Attributes 406 of a service item 410 can contain multiple instances of the same class with different attribute values, as well as multiple instances of different classes. For example, the attributes 406 of a service item 410 might have multiple instances of a Name class, each giving the common name of the service in a different language, plus an instance of a Location class, a Type class, or various other service-specific classes. An example of some added attributes to describe the printer may be the Name, Type, or Location:

```
public class Name implements Entry {
    String name;         //  the user-friendly name of the service
    String description;  //  free-form description of the service
    String language;     //  language (e.g., English, French) used
in the above
}
public class Type implements Entry {
    String type;         //  the general type of service
    String vendor;       //  vendor of product that implements
the service
    String model;        //  model number/name of product
    String version;      //  version number of product
}
public class Location implements Entry {
    Integer floor;       //  what floor the service is on
    String building;     //  what building it's in
    String room;         //  what room it's in
}
```

In this example, the attributes 406 for this service item 410 would be a set of attributes containing the Printer, Name, Type, and Location class instances, each class containing their own individual attributes. However, it should be noted that the scheme used for attributes is not constrained by these examples.

Programs (including other services) that need a particular type of service can use the lookup service 400 to find a stub that can be used to access the service. A match can be made based on the type of service as well as the specific attributes attached to the service. For example, a client could search for a printer by requesting a stub type corresponding to the service desired or by requesting certain attributes such as a specific location or printing speed. In one implementation consistent with the present invention, attributes are stored as multi-entries, and a match on attributes can be made using multi-templates, as explained in co-pending U.S. patent application Ser. No. 09/044,835, entitled "Method and System For Multi-Entry and Multi-Template Matching In A Database", previously incorporated herein.

Accessing a Lookup Service Employing Dynamic Stub Loading and Retrieval

Referring back to FIG. 4, the stub 404 corresponding to a service is registered in the lookup service 400 and is used by the client computer 11(n) to access the service methods remotely. This stub 404 may also be a "smart proxy." A smart proxy, code within which a stub is embedded, helps the client more efficiently implement the stub and the method to be remotely invoked. A smart proxy often performs some local computation for efficiency before or after it actually calls the stub. For example, a smart proxy may contain code to cache information, so if a client requested it again, instead of going back to the server to get the information, it may have cached the answer and be able to return it quickly. If the situation called for it, a smart proxy might also transform the parameters received from the client into other types and then send the transformed types. The smart proxy concept is further explained in co-pending U.S. patent application Ser. No. 09/044,930, entitled "Downloadable Smart Proxies for Performing Processing Associated with a Remote Procedure Call in a Distributed System," assigned to a common assignee, filed on even date herewith, which is hereby incorporated by reference.

Figure 5:
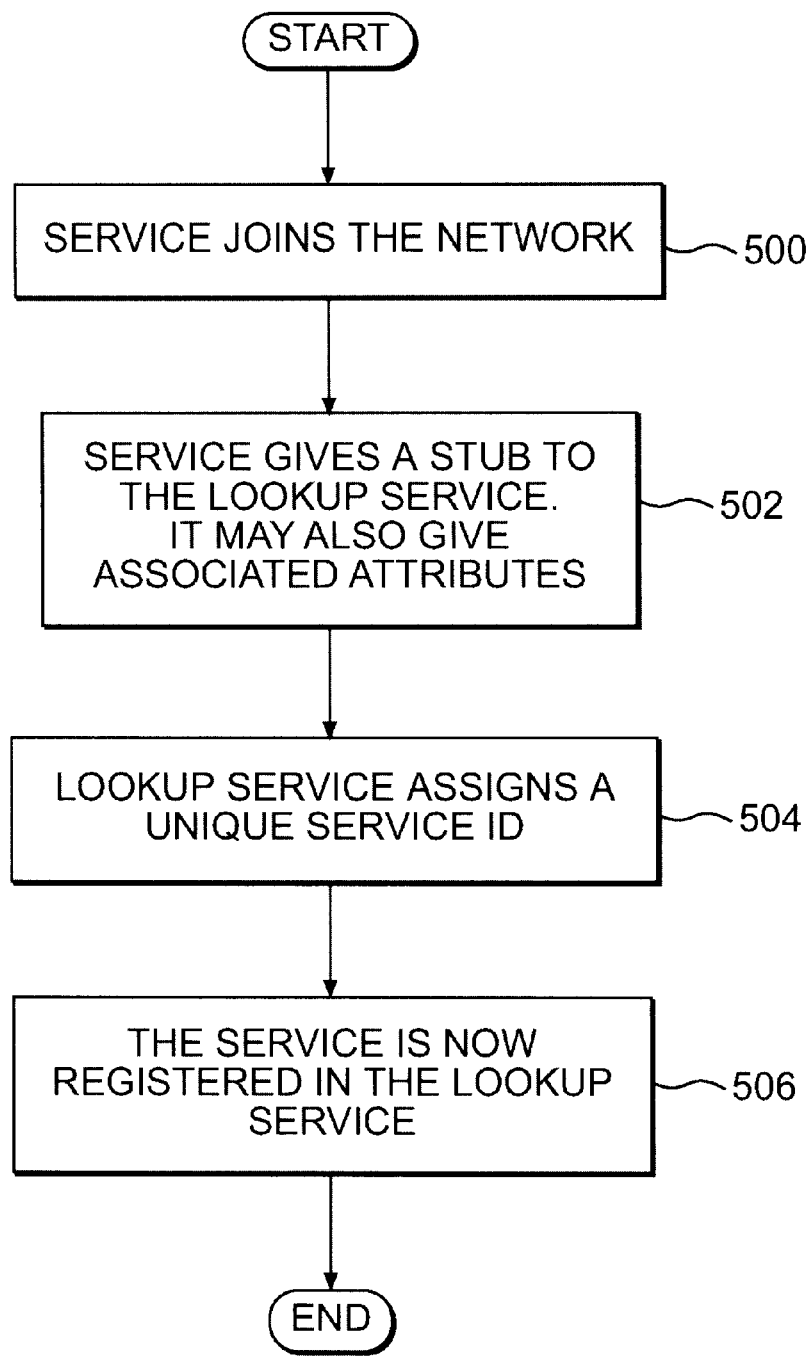
FIG. 5 is a flowchart illustrating a method of adding a stub to the lookup service consistent with the present invention.

FIG. 5 depicts a flowchart illustrating the steps used by systems consistent with the present invention for adding a service stub to the lookup service. When a device joins the network, it typically registers a service with the lookup service (step 500). Upon registration with the lookup service 400, the device supplies a stub 404 to the lookup service, and it may also give its associated attributes 406 to the lookup service (step 502). In response, the lookup service 400 assigns a unique service ID 402, typically a number as previously stated, to the service registered with the lookup service (step 504). Once the device has supplied the lookup service 400 with a stub 404 and attributes 406, and the lookup service has assigned a unique service ID 402, the device has completed registration of the service with the lookup service (step 506). After services are registered with the lookup service 400, clients can use the lookup service to obtain stub information needed to access the registered services.

Figure 6:
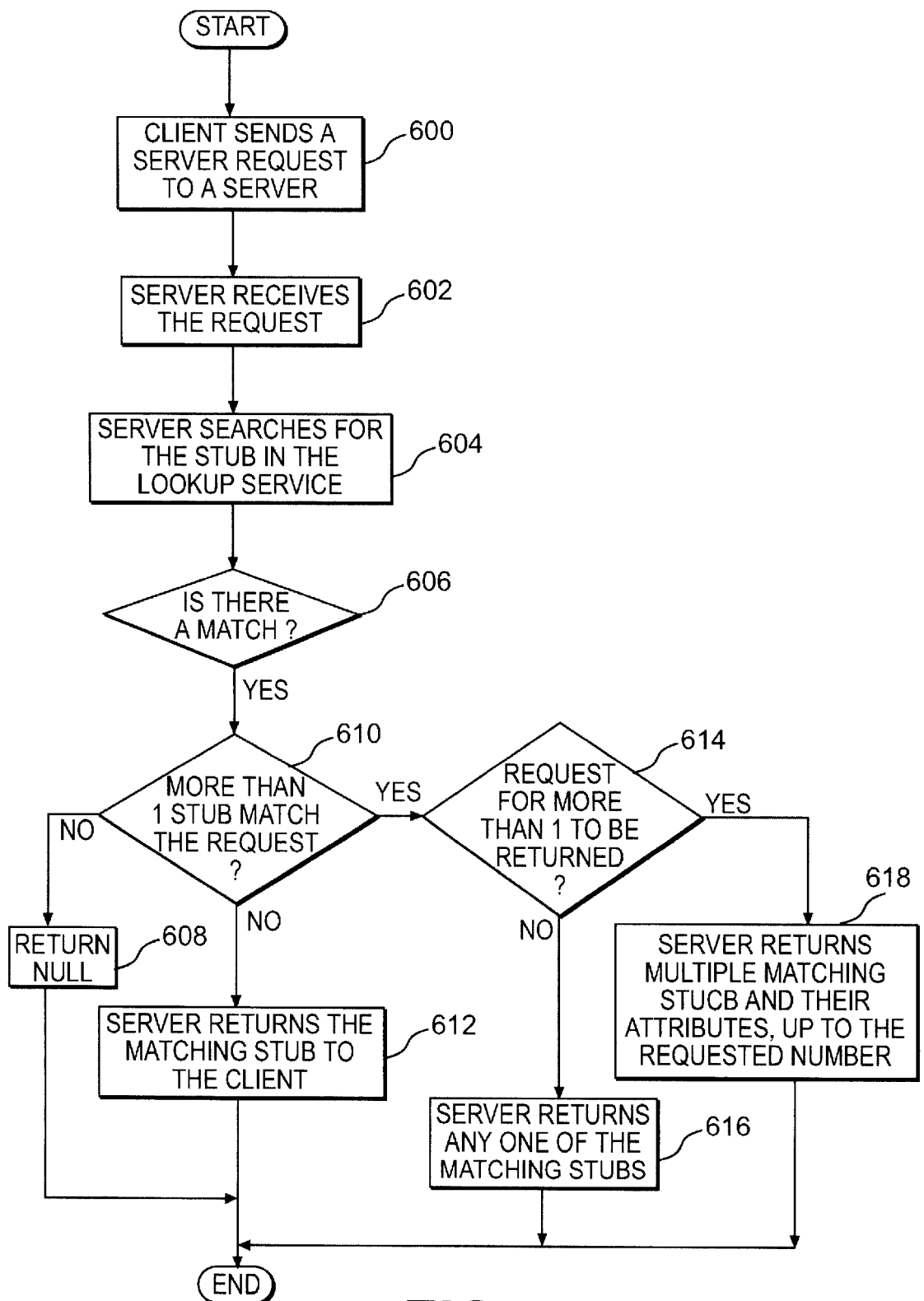
FIG. 6 is a flowchart illustrating a method for retrieving a stub from a lookup service by systems consistent with the present invention.

FIG. 6 depicts a flowchart illustrating steps used by systems and methods consistent with the present invention to download a service item from the lookup service. In one implementation, the client computer 11(*n*) sends a request for a service to the server 12(*m*) with the lookup service 400 (step 600). The request originates from the remote method invocation of a class instance 22 on client computer 11(*n*), and the requested service may reside on a remote server as the exemplary service 38 resides on server 12(I). In one implementation consistent with the present invention, the client computer 11(*n*) may request one or more services from the lookup service 400. The client's request comes in the form of a specific service ID 402, a type of stub 404, or a set of attributes 406, or any combination thereof (step 602). In response to the request, control 19 directs the stub class loader 33 to locate the corresponding stub 404 from the server 12(*m*). To do so, the control 19 enables the stub class loader 33 to initiate communication with the server 12(*m*) to obtain a stub 404 for the service to be obtained.

Upon receipt of the request from the client computer 11(*n*), the control 28 in the server 12(*m*) searches the lookup service 400 for the stub 404 corresponding to the requested service (step 604). If there are no matches found, the control 28 returns a null value (steps 606 and 608). Otherwise, if it locates the stub 404 corresponding to the service that the client computer 11(*n*) is attempting to access, the server 12(*m*) returns the stub to the stub class loader 33 on the client computer (step 612). If more than one stub was located matching the client's request (step 610), in one embodiment consistent with the present invention, any one of the stubs is returned (step 616). In another implementation where the client requests more than one service, the server 12(*m*) returns the requested number of the stubs with their attributes (steps 614 and 618).

When the stub 404 is received by the stub class loader 33, the stub class loader loads it into the execution environment 20. After it is loaded, the service 38 can be remotely invoked. The use of the stub information to invoke remote processing of the service 38 is performed in the same manner as previously discussed in connection with FIG. 3.

Generally, the class instance 22 can use the stub 404 to access the service 38 on the server 12(I). When the class instance 22 requires use of the service 38 corresponding to the returned stub 404, control 19 verifies that the stub 404 is present in the execution environment 20. If so, the class instance 22 can then use the stub 404 to initiate communications with the server 12(I) that maintains the service 38, and parameters will be passed to the service 38 for implementation.

This lookup service implementation is one application of the dynamic loading and retrieval of stub information to enable a program operating in one address space to invoke processing of a procedure in another address space. This implementation of using the dynamic stub loading on the lookup service allows a client to receive stub information to facilitate use of that service directly. Unlike previous lookup services, the lookup service consistent with the present invention returns the code needed to access the service directly. Using the dynamic loading of stub information in this way allows the client to receive all the code necessary to facilitate use of the service on a remote server.

Second Alternative Embodiment of the Present Invention

In accordance with a second alternative embodiment of the present invention, a network proxy is provided that enables orphan services to utilize the lookup service and become integrated into the network environment previously described. An "orphan service" runs on a device that typically has too little memory to support the Java™ runtime system, including the Java™ Virtual Machine and Remote Method Invocation (RMI), discussed further below. To integrate such services into the network environment, the network proxy facilitates lookup-service registration and manages resource allocation on behalf of the services. The network proxy thus integrates devices with limited capabilities, as well as their services, into the network environment described above with little retrofitting.

Figure 7:
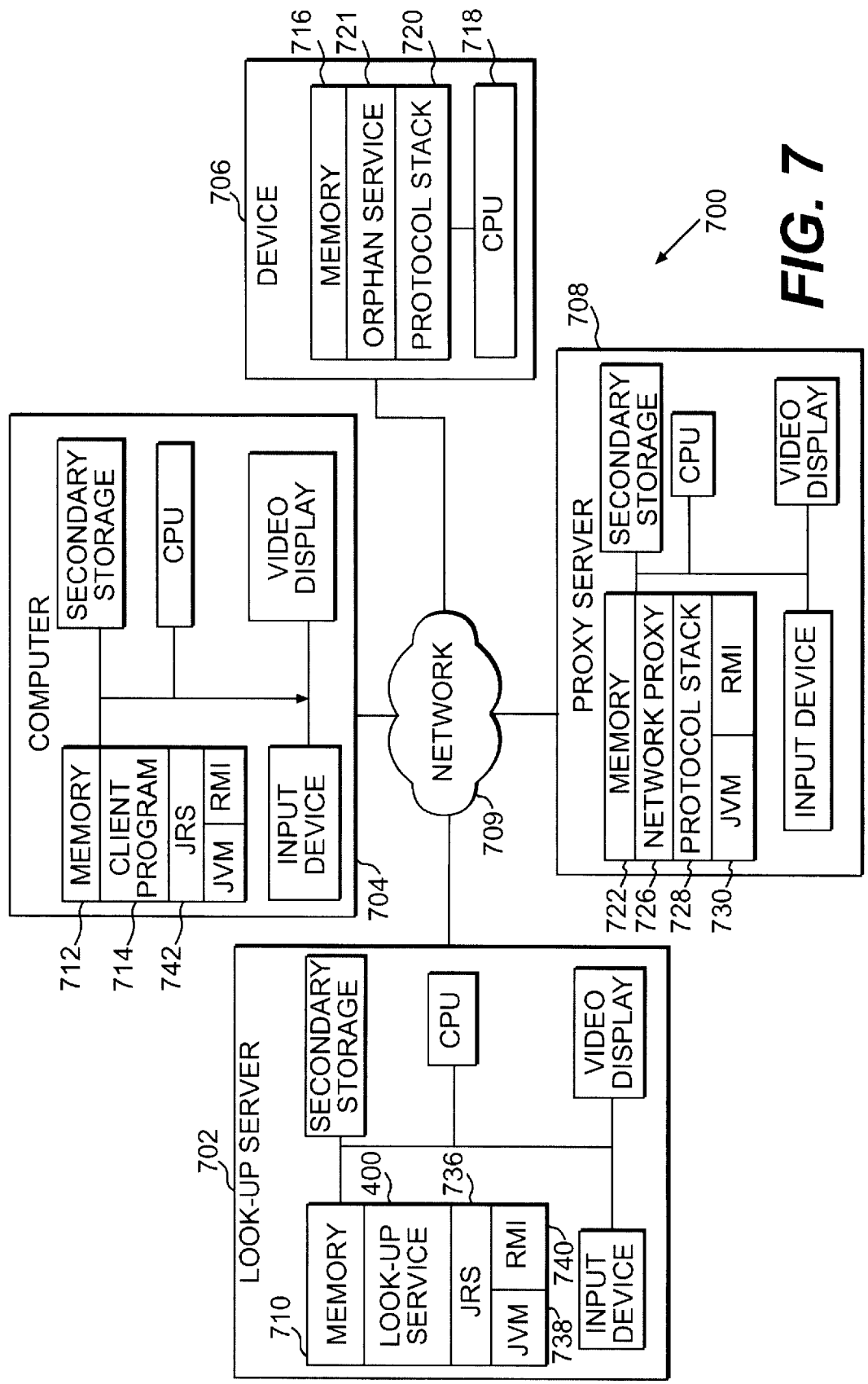
FIG. 7 depicts a data processing system suitable for use with a second alternative embodiment of the present invention.

FIG. 7 depicts a data processing system 700 suitable for use with this embodiment. Data processing system 700 includes a lookup server 702, a computer 704, a device 706, and a proxy server 708, all of which are interconnected via a network 709. Lookup server 702 includes a memory 710 containing lookup service 400 and Java™ Runtime System (JRS) 736 and also includes other standard components, such as secondary storage, a CPU, a video display, and an input device. JRS 736 includes the Java™ Virtual Machine (JVM) 738 and RMI 740. JRS 736, JVM 738, and RMI 740 are provided as part of the Java™ software development kit available from Sun Microsystems of Mountain View, Calif. JVM 738 facilitates platform independence by acting like an abstract computing machine, receiving instructions from programs in the form of byte codes and interpreting these byte codes by dynamically converting them into a form for execution, such as object code, and executing them. RMI 740 facilitates remote method invocation by allowing objects executing on one computer or device to invoke methods of an object on another computer or device.

Computer 704 includes a memory 712 containing a client program 714 and JRS 742 and includes other standard components. Device 706 includes a memory 716 containing a protocol stack 720 as well as an orphan service 721 and also includes a CPU 718. Proxy server 708 includes a memory 722 containing a network proxy 726, a protocol stack 728, and JRS 730 and also includes other standard components. Network proxy 726 is responsible for registering orphan service 721 in lookup service 400 so that client program 714 can utilize the orphan service. Additionally, network proxy 726 provides orphan service 721 with access to various other services provided via lookup service 400.

Figure 8:
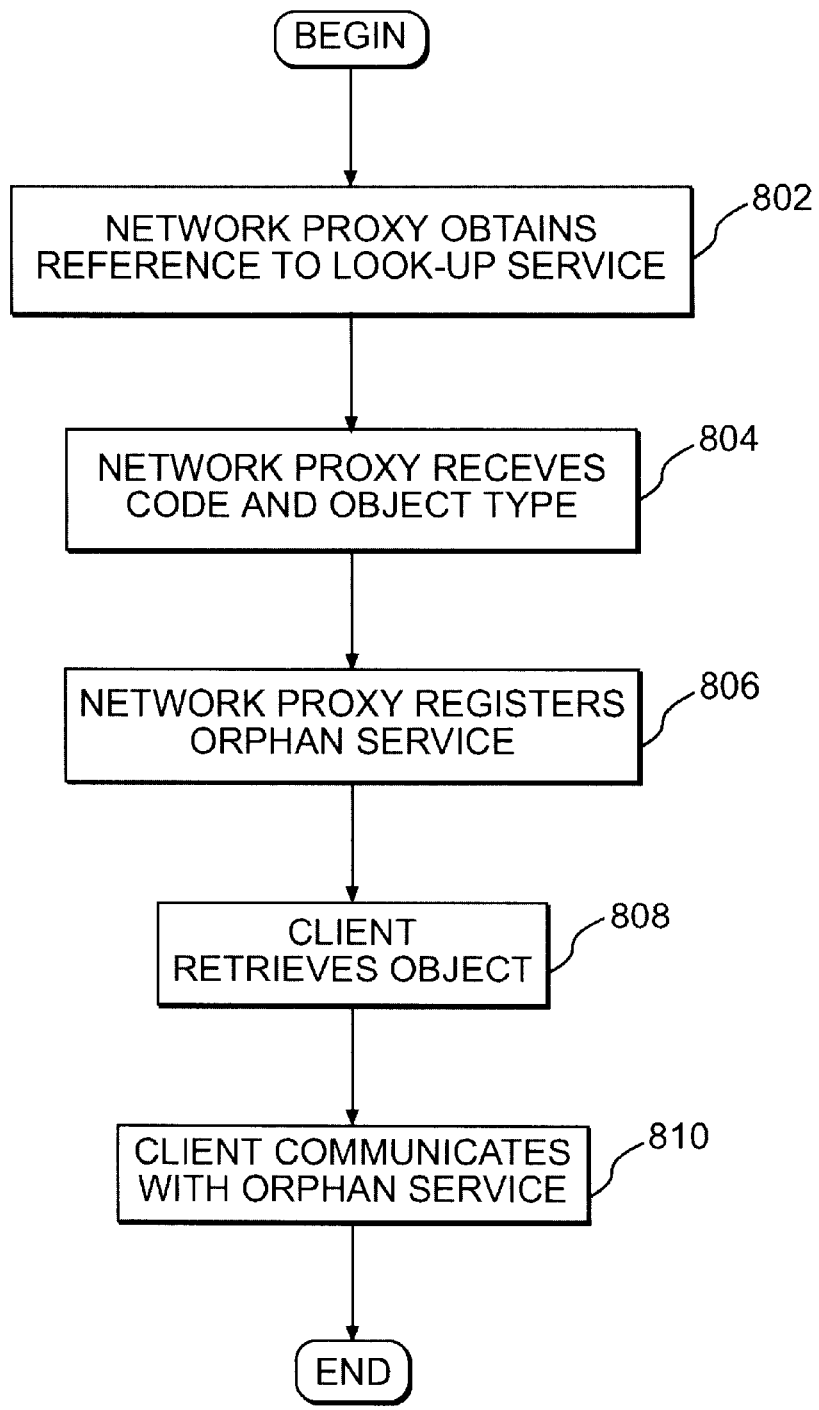
FIG. 8 depicts a flowchart of the steps performed when the network proxy depicted in FIG. 7 registers an orphan service with the lookup service depicted in FIG. 7 in accordance with methods and systems consistent with the present invention.

FIG. 8 depicts a flowchart of the steps performed when the network proxy registers the orphan service with the lookup service so that the client program may utilize it. The first step performed is for the network proxy to obtain a reference to the lookup service (step 802). This step is performed by accessing the discovery server as described in co-pending U.S. patent application Ser. No. 09/044,939, entitled "Apparatus and Method for Providing Downloadable Code for Use in Communicating with a Device in a Distributed System," filed on Mar. 20, 1998, assigned to a common assignee, which has previously been incorporated by reference. After obtaining a reference to the lookup service, the network proxy utilizes protocol stack 728 to communicate with the orphan service via protocol stack 720 (step 804). In this step, the network proxy and the orphan service enter into a peer-to-peer communication session using a protocol such as TCP/IP. During this session, the orphan service provides the network proxy with sufficient information to construct a stub (or object) for registration in the lookup service as previously described. This information, typically stored on the device (e.g., PROM), includes the code for the object, in the form of byte codes, as well as the Java™ programming language object type. Next, the network proxy registers this object in the lookup service as described above (step 806).

After the network proxy registers the orphan service, the client program may access the lookup service to retrieve the object that was registered (step 808). After retrieving the object, the client program can communicate with and utilize the orphan service by invoking the methods on the object (step 810). In this step, the methods of the object registered in the lookup service may communicate directly with the orphan service if the device resides on the same type of network as the client program. Otherwise, if the client resides on a different type of network, the methods may communicate with the network proxy, who will in turn perform a protocol conversion and use the protocol stack to communicate with the orphan service.

Figure 9:
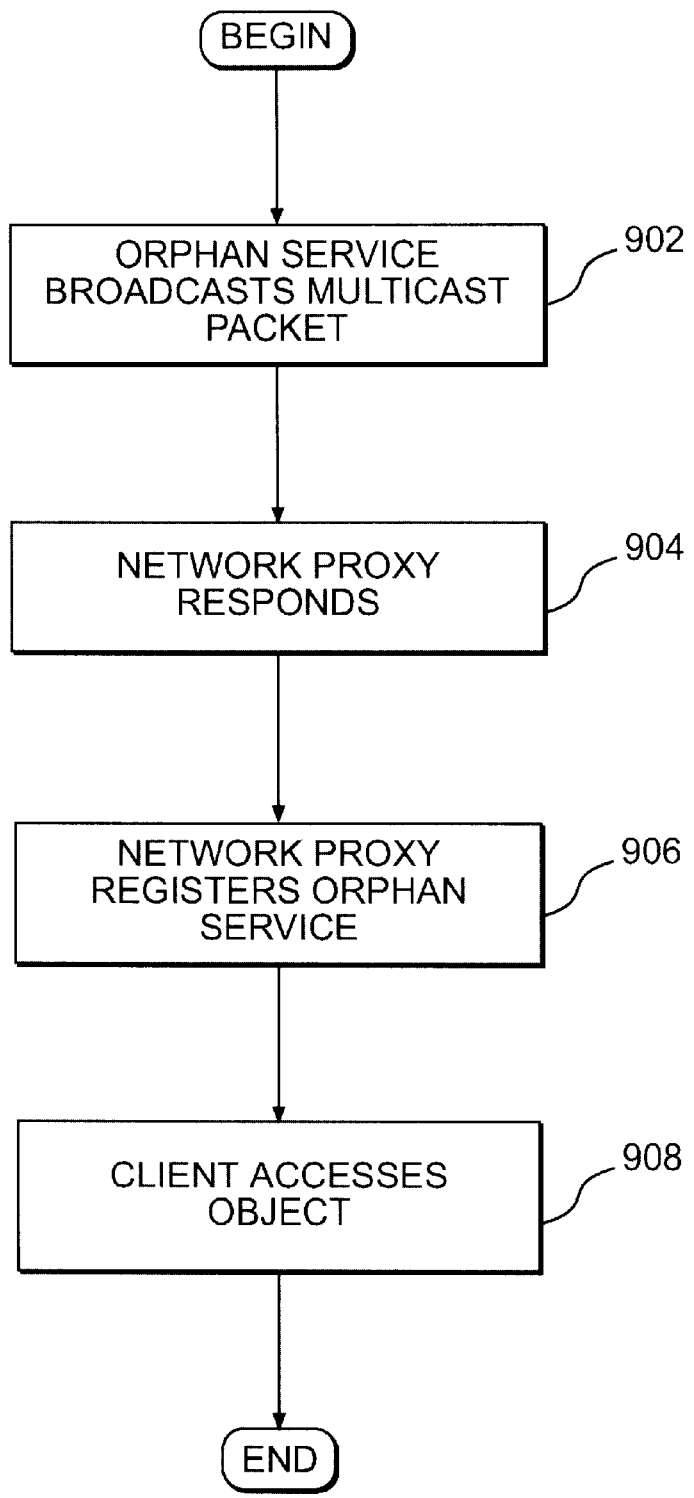
FIG. 9 depicts a flowchart of the steps performed when the network proxy depicted in FIG. 7 registers an orphan service with the lookup service depicted in FIG. 7 in accordance with an alternative embodiment of the present invention.

FIG. 9 depicts a flow chart of the steps performed by an alternative embodiment when the network proxy registers the orphan service with the lookup service so that the client program may utilize it. In this embodiment, the code for the object is stored remotely with respect to the device. For example, the code may be stored on the proxy server. Since the it code is not stored on the device, a peer-to-peer communication session is not necessary, thus relieving the need for the proxy server to utilize a protocol stack and anything else specific to the device, such as a device driver, and allowing the code to be modified without having to access the device. As a result, if the code were burned in PROM, significant processing would be avoided.

In this embodiment, the orphan service broadcasts a multicast packet to a predefined port on the devices on the network (step 902). The network proxy listens on this port and receives the multicast packet containing a location identifier, such as a URL, indicating a location on the network of where the object is located and the object type. The network proxy then responds to the device indicating a successful receipt of the packet (step 904). After receiving the location identifier and the object type, the network proxy registers the orphan service in the lookup service (step 906). In this step, the network proxy may access the object at the specified location and store both the object as well as an indication of its type in the lookup service. Alternatively, the network proxy may store the location identifier and the object type in the lookup service. In this case, when the client program requests the object from the lookup service, RMI retrieves the entry in the lookup service, containing the location identifier (e.g., the URL), accesses the object at that location, and returns the object to the client program, as previously described. Later, the client program may access the object that is either stored in or referenced in the lookup service and communicate directly with the orphan service as stated above (step 908).

Figure 10:
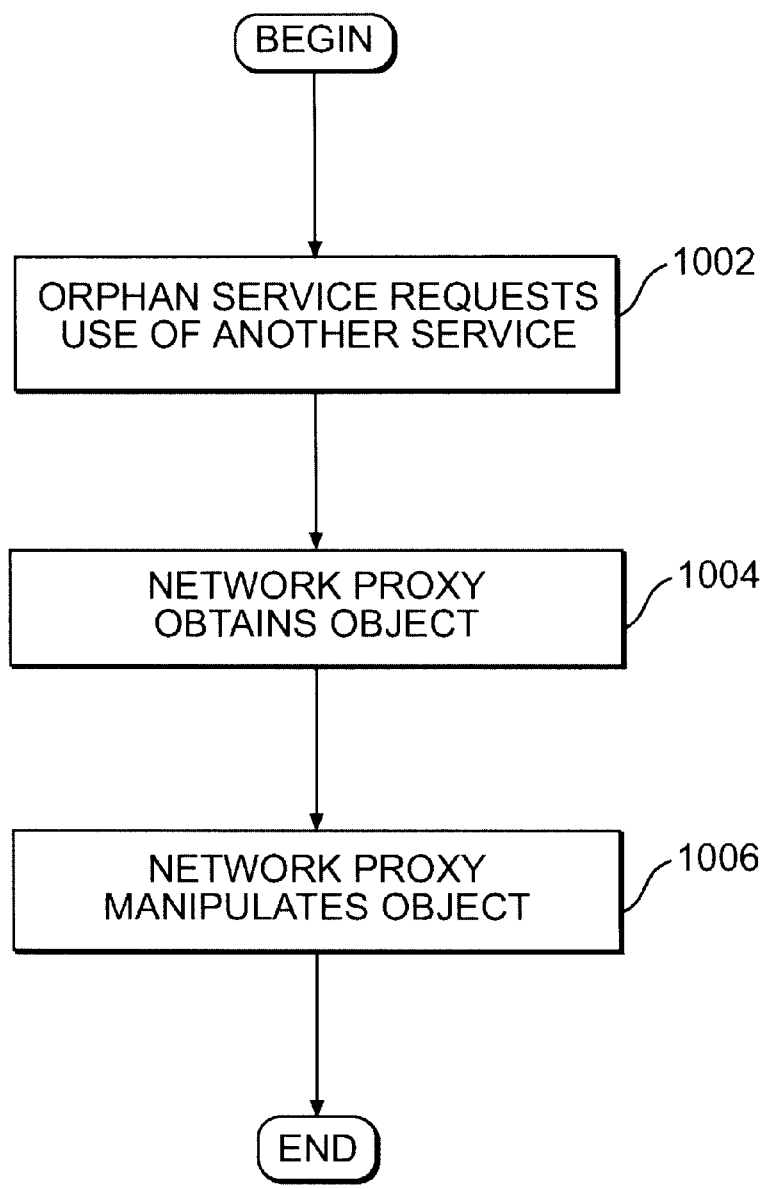
FIG. 10 depicts a flowchart of the steps performed when the network proxy depicted in FIG. 7 manages resource allocation on behalf of the orphan service.

FIG. 10 depicts a flow chart of the steps performed by the network proxy when managing services on behalf of an orphan service. The first step performed is for the network proxy to receive a request from the orphan service for use of another service identified in the request (step 1002). In this step, the network proxy receives the request by listening on the predefined port or by receiving a packet via the protocol stack, depending on the embodiment used. Responsive to this request, the network proxy obtains an object representing the requested service from the lookup service, as previously described, entering into a lease (step 1004). Services in the lookup service are utilized on a lease basis, meaning that the client who is requesting use of the service requests its use for a particular time period, and the service then determines whether it will allow a lease for (1) the entire requested period, (2) less than the entire requested period, or (3) not at all. Leasing of services and resources is further described in copending U.S. patent application Ser. No. 09/044,923, entitled "Method and System for Leasing Storage," U.S. patent application Ser. No. 09/044,838, entitled "Method, Apparatus, and Product for Leasing of Delegation Certificates in a Distributed System," U.S. patent application Ser. No. 09/044,834, entitled "Method, Apparatus, and Product for Leasing of Group Membership in a Distributed System," and U.S. patent application Ser. No. 09/044,916, entitled "Leasing for Failure Detection," all of which have been previously incorporated by reference. The network proxy may then receive requests from the orphan service to manipulate the object and the network proxy responds by manipulating the object accordingly, thus making use of the requested service (step 1006). In this situation, the network proxy may renew the lease when it is near expiration and may cancel the lease when the orphan service has completed its use of the requested service.

Although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from a network, such as the Internet; or other forms of RAM or ROM either currently known or later developed. Sun, Sun Microsystems, the Sun logo, Java™, and Java™-based trademarks are trademarks or registered trademarks of Sun Microsystems, Inc. in the United States and other countries.

The foregoing description has been limited to specific embodiments of the present invention. It will be apparent, however, that various variations and modifications may be made. It is the object of the appended claims to cover these and such other variations and modifications as come within the true spirit and scope of the invention.

What is claimed is:

1. A method in a data processing system having an orphan service on a device and a service registry, the method for registering the orphan service in the service registry comprising the steps performed by the orphan service of:

sending a request for registration in the service registry to a proxy server, whereupon the proxy server registers the orphan service in the service registry to enable a client program to access the orphan service; and receiving a request from the client program for accessing the orphan service.

2. The method of claim 1 wherein the receiving step includes the step of:

receiving the request via the proxy server.

3. A method in a data processing system containing an orphan service on a device, a network proxy, a lookup service, and a client program, the method comprising the steps of:

sending a request from the orphan service to the network proxy for registration in the lookup service;

receiving the request by the network proxy;

registering the orphan service in the lookup service by the network proxy;

accessing the lookup service by the client program to obtain the registration of the orphan service; and accessing the orphan service by the client program using the registration.

4. The method of claim 3 wherein the sending step includes:

sending an object to the network proxy for registration in the lookup service, and wherein the registering step includes:

registering the object.

5. The method of claim 3 wherein the sending step includes:

sending a location identifier to the network proxy, and wherein the registering step includes registering the location identifier.

6. The method of claim 3 wherein the sending step includes:

sending a location identifier to the network proxy, wherein the location identifier identifies the location of an object, and wherein the registering step includes accessing the object using the location identifier and registering the object in the lookup service.

7. The method of claim 3 wherein the client program communicates using a first protocol and the orphan service communicates using a second protocol, and wherein the accessing the orphan service step includes:

requesting the network proxy to access the orphan service on behalf of the client program, wherein the request is communicated using the first protocol;

converting the request into a format suitable to the second protocol by the network proxy; and sending the request to the orphan service by communicating to the orphan service using the second protocol.

8. A data processing system, comprising:

a lookup server containing:

a memory with a lookup service containing registrations that facilitate access to corresponding services, and a processor for running the lookup service;

a device containing:

a memory including an orphan service that requests registration in the lookup service, and a processor for running the orphan service; and a proxy server containing:

a memory containing a network proxy that receives the registration request from the orphan service and that registers the orphan service in the lookup service, and a processor for running the network proxy.

9. The data processing system of claim 8 wherein the network proxy registers the orphan service by storing in the lookup service an object containing methods that facilitate access to the orphan service.

10. The data processing system of claim 9 further including:

a computer containing:

a memory with a client program that retrieves from the lookup service the object corresponding to the orphan service and that invokes the methods to access the orphan service; and a processor for running the client program.

11. The data processing system of claim 10 wherein the methods access the orphan service via the network proxy.

12. The data processing system of claim 11 wherein the network proxy performs protocol conversion when accessing the orphan service on behalf of the client program.

13. The data processing system of claim 8 wherein the memory of the lookup server and the proxy server include the Java™ runtime system, and wherein the lookup service and the network proxy utilize the Java runtime system.

14. A computer-readable medium containing instructions for controlling a data processing system to perform a method for registering an orphan service located on a device in a service registry, the method comprising the steps performed by the orphan service of:

sending a request for registration in the service registry to a proxy server, whereupon the proxy server registers the orphan service in the service registry to enable a client program to access the orphan service; and receiving a request from the client program for accessing the orphan service.

15. The computer-readable medium of claim 14 wherein the receiving step includes the step of:

receiving the request via the proxy server.

16. A data processing system containing an orphan service on a device, a network proxy, a lookup service, and a client program, comprising:

means for sending a request from the orphan service to the network proxy for registration in the lookup service;

means for receiving the request by the network proxy;

means for registering the orphan service in the lookup service by the network proxy;

means for accessing the lookup service by the client program to obtain the registration of the orphan service; and means for accessing the orphan service by the client program using the registration.

* * * * *

UNITED STATES PATENT AND TRADEMARK OFFICE
CERTIFICATE OF CORRECTION

PATENT NO. : 6,708,171 B1
APPLICATION NO. : 09/332031
DATED : March 16, 2004
INVENTOR(S) : James H. Waldo et al.

It is certified that error appears in the above-identified patent and that said Letters Patent is hereby corrected as shown below:

The following documents should be listed on the title page:
Item (56) col. 1

U.S. PATENT DOCUMENTS

| | | |
|---|---|---|
| 4,567,359 | 1/1986 | Lockwood |
| 4,992,940 | 2/1991 | Dworkin |
| 5,253,165 | 10/1993 | Leiseca et al. |
| 5,319,542 | 6/1994 | King, Jr. et al. |
| 5,307,490 | 4/1994 | Davidson et al. |
| 5,327,559 | 7/1994 | Priven et al. |
| 5,475,840 | 12/1995 | Nelson et al. |
| 5,511,196 | 4/1996 | Shackelford et al. |
| 5,544,040 | 8/1996 | Gerbaulet |
| 5,592,375 | 1/1997 | Salmon et al. |
| 5,664,110 | 9/1997 | Green et al. |
| 5,664,111 | 9/1997 | Nahan et al. |
| 5,666,493 | 9/1997 | Wojcik et al. |
| 5,671,279 | 9/1997 | Elgamal |
| 5,675,797 | 10/1997 | Chung et al. |
| 5,694,551 | 12/1997 | Doyle et al. |
| 5,710,887 | 1/1998 | Chelliah et al. |
| 5,715,314 | 2/1998 | Payne et al. |
| 5,721,832 | 2/1998 | Westrope et al. |
| 5,724,540 | 3/1998 | Kametani |
| 5,727,048 | 3/1998 | Hiroshima et al. |
| 5,729,594 | 3/1998 | Klingman |
| 5,742,768 | 4/1998 | Gennaro et al. |

UNITED STATES PATENT AND TRADEMARK OFFICE
CERTIFICATE OF CORRECTION

PATENT NO. : 6,708,171 B1
APPLICATION NO. : 09/332031
DATED : March 16, 2004
INVENTOR(S) : James H. Waldo et al.

It is certified that error appears in the above-identified patent and that said Letters Patent is hereby corrected as shown below:

Title Page con't Item (56) Col. 2

| | | |
|---|---|---|
| 5,758,328 | 5/1998 | Giovannoli |
| 5,778,179 | 7/1998 | Kanai et al. |
| 5,790,677 | 8/1998 | Fox et al. |
| 5,794,207 | 8/1998 | Walker et al. |
| 5,805,805 | 9/1998 | Civanlar et al. |
| 5,809,144 | 9/1998 | Sirbu et al. |
| 5,850,442 | 12/1998 | Muftic |
| 5,963,924 | 10/1999 | Williams et al. |
| 5,982,773 | 11/1999 | Nishimura et al. |
| 5,961,582 | 10/1999 | Gaines |
| 6,009,413 | 12/1999 | Webber et al. |
| 6,016,516 | 1/2000 | Horikiri |
| 6,032,151 | 2/2000 | Arnold et al. |
| 6,044,381 | 3/2000 | Boothby et al. |
| 6,093,216 | 7/2000 | Adl-Tabatabai et al. |
| 6,134,603 | 10/2000 | Jones et al. |
| 6,182,083 B1 | 1/2001 | Scheifler et al. |
| 6,199,116 B1 | 3/2001 | May et al. |
| 6,216,158 B1 | 4/2001 | Luo et al. |
| 6,243,716 B1 | 6/2001 | Waldo et al. |
| 6,263,379 B1 | 7/2001 | Atkinson et al. |
| 6,339,783 B1 | 1/2002 | Horikiri |
| 6,385,643 B1 | 5/2002 | Jacobs et al. |

OTHER PUBLICATIONS

Administrator's Guide, Netscape Enterprise Server, Version 3.0, Netscape Communications Corp., 1998.

Almes et al., "Edmas: A Locally Distributed Mail System," Department of Computer Science, University of Washington, Technical Report 83-07-01, July 7, 1983, Abstract & pages 1-17.

Almes et al., "Research in Integrated Distributed Computing," Department of Computer Science, University of Washington, October 1979, pages 1-42.

UNITED STATES PATENT AND TRADEMARK OFFICE
CERTIFICATE OF CORRECTION

PATENT NO. : 6,708,171 B1
APPLICATION NO. : 09/332031
DATED : March 16, 2004
INVENTOR(S) : James H. Waldo et al.

It is certified that error appears in the above-identified patent and that said Letters Patent is hereby corrected as shown below:

Title Page con't Item (56) Col. 2

Almes et al., "The Eden System: A Technical Review," Department of Computer Science, University of Washington, Technical Report 83-10-05, October, 1983, pages 1-25.

Almes et al., "Integration and Distribution in the Eden System," Department of Computer Science, University of Washington, Technical Report 83-01-02, January 19, 1983, Abstract & pages 1-18.

Almes, "The Evolution of the Eden Invocation Mechanism," Department of Computer Science, University of Washington, Technical Report 83-01-03, January 19, 1983, pages 1-14 & Abstract.

Arnold, Ken, "The Jini Architecture: Dynamic Services in a Flexible Network," Sun Microsystems, Inc., Proceedings of the 36$^{th}$ ACM IEEE Design Automation Conference, June 1999, pages 157-162.

Bandrowski, "Stores Without Doors: Kiosks Generate New Profits," Corporate Computing, October 1992, pages 193-195.

Begole et al., "Transparent Sharing of Java Applets: A Replicated Approach," October, 1997, pages 55-65.

Black et al., "A Language for Distributed Programming," Department of Computer Science, University of Washington, Technical Report 86-02-03, February, 1986, page 10.

Black et al., "Distribution and Abstract Types in Emerald," University of Washington, Technical Report 85-08-05, August, 1985, pages 1-10.

Black et al., "Object Structure in the Emerald System," University of Washington, Technical Report 86-04-03, April, 1986, pages 1-14.

Black et al., "The Eden Project: A Final Report," Department of Computer Science, University of Washington, Technical Report 86-11-01, November, 1986, pages 1-28.

Black et al., "Supporting Distributed Applications: Experience with Eden," Department of Computer Science, University of Washington, Technical Report 85-03-02, March, 1985, pages 1-21.

UNITED STATES PATENT AND TRADEMARK OFFICE
CERTIFICATE OF CORRECTION

PATENT NO. : 6,708,171 B1
APPLICATION NO. : 09/332031
DATED : March 16, 2004
INVENTOR(S) : James H. Waldo et al.

It is certified that error appears in the above-identified patent and that said Letters Patent is hereby corrected as shown below:

Title Page con't Item (56) Col. 2

Black et al., " The Eden Programming Language," Department of Computer Science, FR-35, University of Washington, Technical Report 85-09-01, September, 1985 (Revised December 1985), pages 1-19.

Black et al., "The Eden Project: Overview and Experiences," Department of Computer Science, University of Washington, EUUG, Autumn '86 Conference Proceedings, Manchester, UK, September 22-25, 1986, pages 177-189.

Braine et al., "Object-Flow," 1997, pages 418-419.

Bruno, "Working the Web," Data Communications, April 1997, pages 50-60.

Ciancarini et al., "Coordinating Distrivuted Applets with Shade/Java," 2/1988, pages 130-138.

Cohen, "Electronic Commerce," USC/Information Sciences Institute, October 1989.

Conhaim, "Online shopping: a beginner's guide; includes related listing of videotex services," Link-Up, Vol. 5, No. 6, page 32, November 1988.

"Consumers Can View, Share Picture On-Line as Kodak Picture Network Goes 'Live'," Business Wire, August 25, 1997, pages 18-19.

Delcambre et al., "Simulation of the Object Flow Model: A Conceptual Modeling Language for Object-Driven Applications," 1983, pages 216-225.

Design Project #2, Electronic Shopping at MIT, MIT Class 6.033 Handout 23, Massachusetts Institute of Technology, http://web.mit.edu/6.033/1995/handouts/html/h23.html, Spring 1995, pages 1-6.

Eden Project Proposal," Department of Computer Science, University of Washington, October 1980, Technical Report #80-10-01, cover and Foreword.

Ellsworth, "Boom Town," Internet World, June 1995, pages 33-35.

Estrin, "Inter-Organization Networks: Implications of Access Control Requirements for Interconnection Protocols," ACM, 1986, pages 254-263.

UNITED STATES PATENT AND TRADEMARK OFFICE
CERTIFICATE OF CORRECTION

PATENT NO. : 6,708,171 B1
APPLICATION NO. : 09/332031
DATED : March 16, 2004
INVENTOR(S) : James H. Waldo et al.

It is certified that error appears in the above-identified patent and that said Letters Patent is hereby corrected as shown below:

Title Page con't Item (56) Col. 2

Fleischer, "SkyMall's 'Supplier Network' Takes Flight", Retailtech, The Technology Magazine for Retail Executives, April 1997.

Foley, "Managing Campus-Wide Information Systems: Issues and Problems," Capitalizing on Communication, ACM SIGUCCS XVII, 1989, pages 169-174.

Fryxell, "eaasySABRE," Link-Up, May/June 1996, pages 10-11.

Gardner, "Kodak Follows Startup Into Online Photo Processing Business," Internet World, September 8, 1997, pages 5-6.

Gogan et al., "Open Market, Inc.: Managing in a Turbulent Environment," Harvard Business School Publishing, August 29, 1996, pages 1-30.

Goldberg et al., "Smalltalk-80 – The Language and its Implementation," Xerox Palo Alto Research Center, 1983 (reprinted with corrections, July 1985), pages 1-720.

Hodges, D., "Managing Object Lifetimes in OLE," August 25, 1994, pages 1-41.

Holman et al., "The Eden Shared Calendar System," Department of Computer Science, FR-35, University of Washington, Technical Report 85-05-02, June 22, 1985, pages 1-14.

Hsu, "Reimplementing Remote Procedure Calls," University of Washington, Thesis, March 22, 1985, pages 1-106.

Hutchinson, "Emerald: An Object-Based Language for Distributed Programming," a Dissertation, University of Washington, 1987, pages 1-107.

"ISN Dataweb Sells Software, Hardware," Datamation, April 1, 1996, page 40.

Israel et al., "Authentication in Office System Internetworks," ACM Transactions on Office Information Systems, Vol. 1, No. 3, July 1983, pages 193-210.

Jacob, "The Use of Distributed Objects and Dynamic Interfaces in a Wide-Area Transaction Environment," SIGCOMMn '95 Workshop on Middleware: Cambridge, Mass., August 1995, pages 1-3.

UNITED STATES PATENT AND TRADEMARK OFFICE
CERTIFICATE OF CORRECTION

PATENT NO. : 6,708,171 B1
APPLICATION NO. : 09/332031
DATED : March 16, 2004
INVENTOR(S) : James H. Waldo et al.

It is certified that error appears in the above-identified patent and that said Letters Patent is hereby corrected as shown below:

Title Page con't Item (56) Col. 2

Jul et al., "Fine-Grained Mobility in the Emerald System," University of Washington, ACM Transactions on Computer Systems, Vol. 6, No. I, February, 1988, pages 109-133.

Jul, "Object Mobility in a Distributed Object-Oriented System," a Dissertation, University of Washignton, 1989, pages 1-154 (1 page Vita).

Keller, "Smart Catalogs and Virtual Catalogs," Proceedings of the First USENIX Workshop of Electronic Commerce, USENIX Association, July 11-12, 1995, pages 125-131.

Klein et al., "TRADE'ex: The Stock Exchange of the Computer Industry," Harvard Business School Publishing, 1996, pages 1-14.

"Kodak DC220 And DC260 Digital Cameras Are Shipping To Retailers Across The Country Cameras Are Optimized for USB Interface Supported in Windows 98," Business Wire, June 24, 1998, pages 42-44.

"Kodak demonstrates leadership across entire photographic category," M2 Presswire, February 13, 1998, pages 31-35.

"Kodak PhotoNet Online Makes It a Snap to Share Summer Photos," PR Newswire, July 2, 1998, pages 63-64.

"Kodak Picture Network Sends Prints Home From the Holidays," Business Wire, December 29, 1997, pages 58-60.

Kolodner et al., "Atomic Garbage Collection: Managing a Stable Heap," ACM, 1989, pages 15-25.

KODAK PHOTONET FAQ, PhotoNet Online, June 14, 2002, pages 1-3.

Koshizuka et al., "Window Real-Objects: A Distributed Shared Memory for Distributed Implementation of GUI Applications," 11/1993, pages 237-247.

Kramer, "NETWATCH; The AJC's Daily Online Guide; Get the picture: Kodak will send photos to Web," The Atlanta Journal and Constitution, Sec. Features, pg. 08C, June 5, 1997.

UNITED STATES PATENT AND TRADEMARK OFFICE
CERTIFICATE OF CORRECTION

PATENT NO. : 6,708,171 B1
APPLICATION NO. : 09/332031
DATED : March 16, 2004
INVENTOR(S) : James H. Waldo et al.

It is certified that error appears in the above-identified patent and that said Letters Patent is hereby corrected as shown below:

Title Page con't Item (56) Col. 2

Krasner et al., "Smalltalk-80: Bits of History, Words of Advice," 1983, Xerox Corporation, pages 1-344.

Lampson et al., "Authentication in Distributed Systems: Theory and Practice," ACM Transactions n Computer Systems, Vol. 10, No. 4, November 1992, pages 265-310.

Lansky, "Without APS, Photo Life Goes on Via Internet," Photographic Trade News, August 1996, pages 19-23.

Lavana et al., "Executable Workflows: A Paradigm for Collaborative Design on the Internet," 6/1997, 6 pages.

Lewis, "Pacific Bell, MCI to Expand Internet Service," The New York Times, sec. D, col. 1 at 3, October 28, 1995.

LightSurf Instant Imaging - Press Releases, "Kodak And LightSurf Collaborate On Kodak Picture Center Online," LifeSurf Technologies, Inc., June 14, 2002, pages 1-3.

Louwerse et al., "Data Protection Aspects in an Integrated Hospital Information System," North-Holland Computers & Security 3, 1984, pages 286-294.

McEnaney, "Point-and-Click Memory Sharing; Launches PhotoNet online digital photography and imaging services, " Photographic Trade News, Sec. Pg. 23, January 1997.

Miller, "Web posting as a photo processing option," USA Today, Section: Life, pg. 17D, December 13, 1996.

Morris et al., "Andrew: A Distributed Personal Computing Environment," Communications of the ACM, Vol. 29, No. 3, March 1986, pages 184-201.

O'Mahony, "Security Considerations in a Network Management Environment," IEEE Network, May/June 1994, pages 12-17.

Oppen et al., "The Clearinghouse: A Decentralized Agent for Locating Names Objects in a Distributed Environment," ACM Transactions on Office Information Systems, Vol. 1, No. 3, July 1983, pages 230-253.

UNITED STATES PATENT AND TRADEMARK OFFICE
CERTIFICATE OF CORRECTION

PATENT NO. : 6,708,171 B1
APPLICATION NO. : 09/332031
DATED : March 16, 2004
INVENTOR(S) : James H. Waldo et al.

It is certified that error appears in the above-identified patent and that said Letters Patent is hereby corrected as shown below:

Title Page con't Item (56) Col. 2

Petersen, "New But Not Improved, " Direct Magazine, November, 1995.

Title Page, Page 2 Item 56 Col. 1

Press Release, "Sun Goes Live With The Kodak Picture Network," Sun Microsystems, Inc., June 14, 2002, pages 1-2.

Proceedings of the Eighth Symposium on Operating Systems Principles, December 14-16, 1981, ACM, Special Interest Group on Operating Systems, Association for Computing Machinery, Vol. 15, No. 5, December, 1981, ACM Order No. 534810.

Proudfoot, "Replects: Data Replication in the Eden System," Department of Computer Science, University of Washington, Technical Report No. TR-85-12-04, December 1985, pages 1-156.

Pu, "Replication and Nested Transaction in the Eden Distributed System," Doctoral Dissertation, University of Washington, August 6, 1989, pages 1-179 (1 page Vita).

Raeder, "Is there a Prodigy in your future?," Database Searcher, Vol. 5, No. 6, page 18.

Ramm et al., "Exu - A System for Secure Delegation of Authority on an Insecure Network," Ninth System Administration Conference, 1995 LISA IX, September 17-22, 1995, pages 89-93.

"Photo processing made easy on the Internet; Storm Software and PictureVision team up with Konica Corp.," Business Wire, February 22, 1996, pages 3-4.

Satyanarayanan, "Integrating Security in a Large Distributed System," ACM Transactions on Computer Systems, Vol. 7, No. 3, August 1989, pages 247-280.

Schroeder et al., "Experience with Grapevine: The Growth of a Distributed System," ACM Transactions on Computer Systems, Vol. 2, No. 1, February 1984, pages 3-23.

UNITED STATES PATENT AND TRADEMARK OFFICE
CERTIFICATE OF CORRECTION

PATENT NO. : 6,708,171 B1
APPLICATION NO. : 09/332031
DATED : March 16, 2004
INVENTOR(S) : James H. Waldo et al.

It is certified that error appears in the above-identified patent and that said Letters Patent is hereby corrected as shown below:

Title Page Page 3 Item 56 Col. 1

"Seeing your photos a whole new way," Business Wire, December 12, 1996, pages 9-10.

Senn, "Capitalizing on Electronic Commerce: The Role of the Internet in Electronic Markets," Information Systems Management, Summer 1996, pages 15-24.

Steinke, "Design Aspects of Access Control in a Knowledge Base System," Computers & Security, 10, 1991, pages 612-625.

Stern, "Industry Net," Link-Up, October/April 1995, page 10.

Tanenbaum et al., "Distributed Operating Systems," Computing Surveys, Vol. 17, No. 4, December 1985, pages 419-470.

The Wall Street Journal, "Barclays Is Opening An 'Electronic Mall' For Internet Shopping," Tech. & Health Section at B2, June 1, 1995.

The Wall Street Journal, "Prodigy Plans to Announce Internet 'Electronic Mail'," Tech. Section at B5, November 27, 1995.

Trehan et al., "Toolkit for Shared Hypermedia on a Distributed Object Oriented Architecture," 1983, pages 1-8.

Trommer, "Thomas Unveils Online Purchasing Network - Eases Product Sourcing And Ordering Through EDI," Electronic Buyers' News at 60, December 11, 1995.

UNITED STATES PATENT AND TRADEMARK OFFICE
CERTIFICATE OF CORRECTION

PATENT NO. : 6,708,171 B1
APPLICATION NO. : 09/332031
DATED : March 16, 2004
INVENTOR(S) : James H. Waldo et al.

It is certified that error appears in the above-identified patent and that said Letters Patent is hereby corrected as shown below:

Title Page Page 4 Item 56 Col. 1 van den Berg et al., "Advanced Topics of a Computer Center Audit," North-Holland Computers & Security 3, 1984, pages 171-185.

van der Lans, "Data Security in a Relational Database Environment," North-Holland Computers & Security 5, 1986, pages 128-134.

"Webwatch: MCI Announces Internet Access," Boardwatch Magazine, January 1995.

Welz, "New Deals: A ripening Internet market, secure systems and digital currency are reshaping global commerce," Internet World, June 1995, pages 36-41.

Wobber et al., "Authentication in the Taos Operating System," ACM, 1993, pages 256-269.

Wyatt, "Netscape Enterprise Server," Prima Publishing, 1996.

Signed and Sealed this

Seventeenth Day of October, 2006

JON W. DUDAS
*Director of the United States Patent and Trademark Office*